United States Patent
Naritomi et al.

(10) Patent No.: US 8,696,923 B2
(45) Date of Patent: Apr. 15, 2014

(54) COMPOSITE OF STEEL AND RESIN AND METHOD FOR MANUFACTURING SAME

(75) Inventors: Masanori Naritomi, Chuo-ku (JP); Naoki Andoh, Chuo-ku (JP)

(73) Assignee: Taisei Plas Co., Ltd., Tokyo (JP)

( * ) Notice: Subject to any disclaimer, the term of this patent is extended or adjusted under 35 U.S.C. 154(b) by 38 days.

(21) Appl. No.: 13/608,274

(22) Filed: Sep. 10, 2012

(65) Prior Publication Data

US 2013/0004790 A1 Jan. 3, 2013

Related U.S. Application Data

(62) Division of application No. 12/810,726, filed as application No. PCT/JP2008/073769 on Dec. 26, 2008, now Pat. No. 8,283,043.

(30) Foreign Application Priority Data

Dec. 27, 2007 (JP) ................................. 2007-336378

(51) Int. Cl.
 *C03C 15/00* (2006.01)
 *C03C 25/68* (2006.01)

(52) U.S. Cl.
 USPC .............................. 216/83; 216/100; 428/141

(58) Field of Classification Search
 USPC ............. 29/458; 349/58; 428/141, 147, 312.2, 428/312.8, 36.9, 413, 416, 420, 457, 461, 428/545, 612; 216/83
 See application file for complete search history.

(56) References Cited

U.S. PATENT DOCUMENTS

| | | | |
|---|---|---|---|
| 4,202,709 A * | 5/1980 | Shibamori et al. ............ | 148/531 |
| 5,532,051 A | 7/1996 | Nishiura et al. | |
| 6,485,806 B1 | 11/2002 | Tateyama et al. | |
| 8,057,890 B2 | 11/2011 | Iwahashi et al. | |
| 2006/0257624 A1 * | 11/2006 | Naritomi et al. ............. | 428/141 |

FOREIGN PATENT DOCUMENTS

| | | | |
|---|---|---|---|
| JP | 2003-073630 A | 3/2003 | |
| JP | 2005-205056 A | 8/2005 | |
| JP | 2007-144795 A | 6/2007 | |

(Continued)

OTHER PUBLICATIONS

Machine translation of JP2005-205056, provided in divisional U.S. Appl. No. 12/810,726, pulled Feb. 8, 2012.*

(Continued)

*Primary Examiner* — Duy Deo
*Assistant Examiner* — Erin Bergner
(74) *Attorney, Agent, or Firm* — Westerman, Hattori, Daniels & Adrian, LLP

(57) ABSTRACT

In the composite, an aluminum-plated steel sheet and a resin are securely and integrally joined together. Through chemical etching, the aluminum-plated steel sheet is caused to have a surface configuration, in which three-dimensional protrusions having shapes with a minor diameter of at least 0.3 μm and a major diameter of at least 3 μm are scattered over a plain part and a portion covered with shallow fine recesses with a diameter of 20 to 50 nm in a state of being distributed adjacent to each other on the plain part accounts for 30 to 50% of the surface area of the plain part. The surface of the three-dimensional protrusions is mainly ceramic containing silicon and the plain part is mainly ceramic containing aluminum. The resin is joined through injection molding with the aluminum-plated steel sheet having been inserted into a metallic mold.

12 Claims, 9 Drawing Sheets

(56) References Cited

FOREIGN PATENT DOCUMENTS

| JP | 2007-182071 | A  | 7/2007 |
| WO | 2004-041533 | A1 | 5/2004 |
| WO | 2007-040245 | A1 | 4/2007 |

OTHER PUBLICATIONS

International Search Report of PCT/JP2008/073769, Mailing Date of Apr. 7, 2009 (2 pages).

* cited by examiner

COMPOSITE OF STEEL AND RESIN AND METHOD FOR MANUFACTURING SAME

CROSS-REFERENCE TO RELATED APPLICATIONS

This application is a Divisional of U.S. application Ser. No. 12/810,726, filed Jun. 25, 2010, and wherein application Ser. No. 12/810,726 is a national stage application filed under 35 USC 5371 of International Application No. PCT/JP2008/073769, filed Dec. 26, 2008, and which is based upon and claims the benefit of priority from the prior Japanese Patent Application No. 2007-336378, filed on Dec. 27, 2007, the entire contents of which are incorporated herein by reference.

FIELD OF THE INVENTION

This invention relates to a composite of steel and resin and to a method for manufacturing the same and more particularly relates to a composite of steel and resin with enhanced corrosion resistance and applicability in steel applications such as aluminum-plated steel sheets used in building materials, outdoor devices, construction machinery parts, general machinery parts and so forth and to a method for manufacturing the same. More particularly, the present invention relates to a precoated steel sheet with high corrosion resistance and to a method for manufacturing the same, as well as to metal parts in which aluminum-plated steel sheets have been joined each other or an aluminum-plated steel sheet and another metal part have been bonded with an adhesive; a composite in which an aluminum-plated steel sheet and a resin part have been directly joined; a composite in which an aluminum-plated steel sheet and a fiber-reinforced plastic (hereinafter referred to as FRP) have been integrated via an adhesive; or a composite of steel and resin in which an aluminum-plated steel sheet and a polishing material such as a cured phenol resin have been integrated via an adhesive and to a method for manufacturing the same.

BACKGROUND OF THE INVENTION

Adhesives for joining metals together, techniques for securely bonding a metal and a synthetic resin and the like are needed not only in the manufacture of industrial parts for automobiles, consumer electrical products, industrial devices and so forth but also in a wide variety of industrial fields including building materials and heavy construction materials. Many adhesives have been developed to this end, including some truly outstanding adhesives.

However, more rational joining methods that do not involve the use of an adhesive have also been studied conventionally. An example of this is a method in which a high-strength engineering resin is integrated, without the use of an adhesive, with a light metal, such as magnesium, aluminum or an alloy of these, with stainless steel or with another such iron alloy. For instance, the inventors proposed a method in which a resin portion is formed by injecting a thermoplastic resin onto a metal part inserted beforehand in an metallic mold for injection molding and this molded article is joined with the metal part at the same time (hereinafter abbreviated as "injection joining").

The inventors proposed a manufacturing technique in which a polybutylene terephthalate resin (hereinafter referred to as "PBT") or a polyphenylene sulfide resin (hereinafter referred to as "PPS") is joined by injection joining to an aluminum alloy (see, for example, WO 2003-064150: Patent Document 1). The inventors also proposed a joining technique in which somewhat large holes are formed in an anodized film of an aluminum material and a synthetic resin penetrates into the holes and bonding is made (see, for example, WO 2004/055248: Patent Document 2).

The principle behind the injection joining proposed in Patent Document 1 is that an aluminum alloy is immersed in a weak aqueous solution of a water-soluble amine compound and the aluminum alloy is finely etched by the weak basicity of the aqueous solution. With this immersion, the adsorption of the amine compound molecules to the aluminum alloy surface occurs at the same time. The aluminum alloy thus treated is inserted into an metallic mold for injection molding and a molten thermoplastic resin is injected at high pressure.

At this point, the thermoplastic resin and the amine compound molecules adsorbed to the aluminum alloy surface come together, which generate heat or bring about a polymer breaking reaction. In parallel with this chemical reaction, the molten resin touches the aluminum alloy held at the low temperature of the mold to be quenched, thus crystallizes and solidifies (crystallization reaction). The chemical reaction and the crystallization reaction are considered to be in a competitive reaction relation for some reason and in this case the chemical reaction proceeds, while the crystallization reaction is suppressed. As a result, the viscosity of the resin does not rise sharply even though the resin is cooled by the aluminum alloy and the resin can work its way into the ultrafine recesses on the aluminum alloy surface.

Consequently, the aluminum alloy and the thermoplastic resin are securely joined, without the resin separating from the aluminum alloy surface. Specifically, when there is a chemical reaction that suppresses a crystallization reaction, strong injection joining is possible. Actually, it has been confirmed that PBT or PPS, which are capable of undergoing a chemical reaction with amine compounds, can be joined by injection joining with this aluminum alloy. The inventors called the mechanism of this injection joining the NMT (short for Nano Molding Technology) theory (hypothesis).

Also, although not the NMT theory, there is a known technique with which chemical etching is performed beforehand, then a metal part is inserted into the mold of an injection molding machine and injection molding is performed using a thermoplastic resin material (see, for example, Japanese Patent Application Laid-Open No. 2001-225352: Patent Document 3). This technique is somewhat unsophisticated as a joining method and its joining strength does not rise to the level of that produced with the NMT theory, but while the NMT theory was aimed only at aluminum alloys, the advocates of the NMT theory (the inventors of the present invention) also believed that a new joining technique should be developed for the injection joining of metals other than aluminum alloys.

As a result of development conducted for this purpose, the inventors arrived at a novel technique, called the "new NMT" theory. This holds that there are conditions under which injection joining is possible without the chemical adsorption of an amine compound to the surface of a metal part, that is, without the assistance of any special chemical reaction or any particular exothermic reaction. This new NMT theory is discussed below and it has been proven with many kinds of metal alloys.

At least the following conditions are required with an injection joining theory based on the new NMT theory. The first is that a hard, highly crystalline resin be used, that is, that PPS, PBT or an aromatic polyamide be used. Furthermore, these need be a composition that is further improved for the purposes of injection joining. Another condition is that the surface layer of the metal part inserted into the mold be tough and hard and have a specific surface configuration.

For instance, when a shaped magnesium alloy is used, corrosion resistance is low with a plain magnesium alloy covered with a natural oxidation layer. In this case, a surface covered with a hard, highly crystalline ceramic can be obtained by subjecting this alloy to a chemical conversion treatment to change the surface layer into a metal oxide, a metal carbide or a metal phosphide. The above-mentioned conditions can be met with a magnesium alloy part having such a ceramic surface layer and having a texturing of the micron order.

The following applies theoretically if a case is considered in which a shaped magnesium alloy that has undergone such a surface treatment is inserted into a metallic mold for injection molding. Since the mold and the inserted shaped magnesium alloy are held at a temperature that is lower by approximately 150° C. than the melting point of the resin, the injected resin is quenched as soon as it enters the flow path inside the mold and it is very likely that it will be under its melting point at the moment when it approaches the magnesium metal part.

When any kind of crystalline resin is rapidly cooled from a molten state to below its melting point, it does not crystallize right away and there is a period, albeit brief, in which it remains in a molten state under its melting point or, in other words, in a supercooled state. If the diameter of the recesses in the shaped magnesium alloy is relatively large (about 1 to 10 μm) and the depth of these recesses is up to about half of the diameter, then with some resin compositions, the resin will be able to work its way into the recesses within the limited time in which microcrystals are produced after supercooling.

Also, even if the number density of polymer microcrystal groups produced is still low, the resin will be able to work its way in if the recesses are large. This is because the size of the microcrystals having the form, at which some kind of ordered state occurred in the molecular chains from molecular chains that were moving irregularly, is considered to be a size of a few nanometers to 10 nm, estimating from a molecular model.

Consequently, while it is not really the case that microcrystals can easily penetrate into ultrafine recesses with a diameter of 10 nm, it is possible that some of the resin flow might poke into the recesses if the irregular surface had a period of a few dozen nanometers. Still, since countless microcrystals are generated at the same time, there is a sharp rise in the viscosity of the resin flow at the distal ends of the injected resin or where it touches the metal surface of the mold.

The upshot of this is that, when using a resin whose crystallization rate during quenching has been slowed with a special compound, if the period is 1 to 10 μm and the depth is about 0.5 to 5 μm (or half the period), the molten resin will be able to penetrate down to the bottom of those recesses and, if there should be fine texturing with a period of about 10 to 100 nm on the inner wall surfaces of these recesses, then some of the resin flow might poke into the recesses of the gaps between this fine texturing. It just so happens that an ultrafine textured surface with a period of 10 to 50 nm has been observed by electron microscope observation of the surface of a magnesium alloy that has undergone chemical conversion treatment and it has been confirmed that there is the above-mentioned fine surface structure.

In addition to magnesium alloys, when injection joining is performed on other metal parts having a surface with a similar configuration, the resin flow is able to penetrate to the bottom of large recesses on the micron order (that is, peaks and valleys with a period of 1 to 10 μm, with the height difference between these peaks and valleys being about half the period) and, if the resin flow is caught by the harder, fine peaks and valleys among these large recesses, then it can be surmised that when the resin is crystallized and solidified in these large recesses, it will probably be quite difficult for it to be pulled out.

Alloy parts of copper, titanium or steel were actually produced by performing etching and chemical treatment in an attempt to achieve such a configuration and, when a modified PPS resin was used in injection joining, a considerably strong joint was obtained as a result. The surface of the shaped alloy was subjected to oxidation or chemical conversion treatment to produce ceramic fine-crystal groups such as metal oxide or an amorphous layer, which served as hard and tough spikes. That is, the fine texturing serves as spikes in the large recesses and the resin that has solidified in the large recesses will not come loose even when a strong peeling force is exerted on the resin, so that as a result there is a strong joint between the shaped alloy and the resin.

The modified PPS resin, etc., mentioned above will now be discussed. In injection molding, the resin composition is quenched by injection from its molten state to a temperature below its melting point. If a resin composition is obtained that has the property whereby the crystallization rate during quenching is slowed, then the lengthened time before crystallization allows the resin to penetrate into the tiny recesses on the metal alloy part that is inserted into the mold, such as those discussed above, and this gives rise to a stronger joint. This is an important condition for a resin composition that is suited to injection joining.

Based on this line of thinking, the inventors discovered that if a shaped magnesium alloy or other metal alloy is chemically etched as discussed above and the surface layer is made to be a hard ceramic by a surface treatment such as chemical conversion treatment, then a hard crystalline resin with a special composition can be joined by injection joining to this and good joinability can be obtained (see WO 2008/069252: Patent Document 4, WO 2008/047811: Patent Document 5, WO 2008/078714: Patent Document 6, WO 2008/081933: Patent Document 7 or PCT/JP 2008/062945: Patent Document 8). Each of these patent documents corresponds to a type of metal but what they all have in common is the above-mentioned new NMT theory. In other words, it can be seen that the technology discussed in these patent documents shares a common theory that does not depend on the type of metal.

Substantially final conditions for the new NMT theory will be discussed now. First, regarding the metal alloy, it is a basic requirement that a chemical treatment be performed that suits the type of metal alloy, resulting in a surface that matches the following conditions (1) to (3):

(1) the surface has micron-order roughness, which is a textured face in which the period of texturing is 1 to 10 and the height difference is about half that period;

(2) the surface of the walls inside the recesses has fine texturing with a period of 10 to 500 nm and most preferably 50 to 80 nm; and (3) the surface is covered with a thin layer of a hard ceramic phase and, more specifically, is covered with a thin layer of a metal oxide or metal phosphide that is environmentally stable.

The concept is simple: if we assume that a liquid resin composition penetrates into the recesses on the surface of this metal alloy and is solidified and hardened after penetration, the metal alloy base material and the solidified resin component will be joined extremely tightly.

The injection joining of a thermoplastic resin will now be explained based on this new NMT theory as follows. When a hard, highly crystalline thermoplastic resin composition whose crystallization and solidification rate during quenching has been slowed is injected, the resin composition injected into the metallic mold for injection molding remains in a supercooled liquid state for a while after being cooled to a temperature below its melting point. Consequently, if the metal alloy is inserted into the metallic mold for injection molding beforehand, the resin can easily work its way into the recesses mentioned in the condition (1).

The resin can also penetrate into the recesses of the fine texturing in the condition (2) to a certain extent, although not completely. After this, crystallization proceeds faster and solidification is reached, then the resin that has penetrated into and solidified in the recesses is caught by the fine texturing in the condition (2), while this fine texturing is extremely hard because of the condition (3), so the resin securely fastened as if it were spiked and cannot come loose from the recesses. This is the idea behind injection joining using a thermoplastic resin (Patent Documents 4 to 8).

The joining method can also be changed along the same concept as the new NMT theory. That is, a resin composition is produced beforehand by a method such as injection joining using as the raw material a resin composition whose main component is a hard, highly crystalline resin. Meanwhile, a metal alloy piece that satisfies the above conditions (1) to (3) is produced and this is heated with a hot plate or the like. The above-mentioned resin composition is pressed against this heated metal alloy piece. If the temperature of the metal alloy piece is higher than the melting point of the resin composition, the resin composition will melt at the contact surface.

If this product is allowed to stand and the temperature at the contact face between the metal and resin drops below the resin melting point over a period of a few seconds to 10 seconds or more, part of the molten resin will penetrate into the recesses on the metal surface, after which it will crystallize and solidify. If this method is used, there is no need for the crystallization and solidification rate during quenching to be slowed with a special compound or the like, so the conditions required by the resin composition are less severe. Unlike with injection joining, the pressure during penetration is extremely low, at only about 1 atmosphere, even if the environment during melting is returned to normal pressure from a vacuum. Thus, while it is impossible to raise the joining strength to the highest level, such a joining strength can be obtained that is usable from a practical standpoint. This is a molded article pressure welding method involving the use of a highly crystalline thermoplastic resin (see PCT/JP 2008/066009: Patent Document 9).

Also, if the joining mechanism of the new NMT theory is correct, then we can anticipate that bonding with a one-component thermosetting adhesive will yield extremely strong joining. Specifically, this is because it is surmised that the liquid resin approaches the metal alloy that has undergone surface treatment according to the new NMT theory and penetrates into the micron-ordered recesses, the resin penetrates to a certain extent into the gaps between the fine texturing on the surface of the inner walls of these recesses and the resin is then solidified and hardened, so that a spiking effect prevents the solidified resin from coming loose from the recesses and a strong joint is obtained. However, how far the resin can penetrate into the gaps of the fine texturing is determined by the viscosity of the liquid resin in that environment (pressure and temperature).

In this sense, the principle is that powerful adhesive strength is obtained by bonding with a one-component thermosetting adhesive, while the liquid viscosity of the resin in its unsolidified state is an important point. The inventors performed surface treatment of metal alloy pieces according to the new NMT theory, bonded two of these metal alloy pieces together using a one-component epoxy adhesive for general use and confirmed that powerful adhesion of 40 to 70 MPa was obtained in tests for shear breaking strength and tensile breaking strength.

Some slight modifications were made after adhesive coating. Specifically, the coated material was put in a desiccator, placed under a vacuum and then returned to normal pressure, thus the procedure was repeated. The pressure difference was only about 1 atmosphere but the liquid adhesive seems to readily penetrate into the recesses on the metal surface. After this, the coated metal alloy pieces were fixed together with clips or the like, heated and the adhesive was cured, which gave a securely bonded metal alloy pieces not seen in the past. The inventors have named this the NAT (short for Nano Adhesion Technology) theory, to make it clear that it is distinct from technology that utilizes injection molding.

The reason a one-component adhesive is preferable with the NAT theory is that such an adhesive will not gel in coating and subsequent pre-curing operations and the molecules that make up the resin component have a small molecular diameter, so this adhesive can penetrate to a certain extent into the gaps between the fine texturing in the condition (2). Even with a two-part thermosetting adhesive, joint strength will increase if a metal alloy is used that has undergone surface treatment according to the NAT theory but this will not usually rise to the level of a dramatic increase in adhesion strength. This is because nearly all two-part adhesives begin to gel the instant the curing agent component is added to and mixed with the main liquid and, if gelling occurs, there will be less penetration of the resin component into the gaps of the fine texturing in the condition (2).

In other words, when a two-part adhesive is used, adhesion strength often varies with the length of time that has passed after the curing agent was mixed in, which is undesirable in that it can result in inferior stability or inferior reproducibility. However, it should be understood that even an epoxy resin adhesive in which the curing agent is an acid anhydride, which is generally considered to be a two-part adhesive, can be used favorably if it takes a long time for gelling to start and if the gelling temperature is high. Adhesives such as this can be considered to be the same as a one-component adhesive.

The same can be said about a phenol resin-based adhesive or an unsaturated polyester resin-based adhesive. Specifically, there are commercially available phenol resin-based adhesives but most of them contain a solvent and are thus not solvent-free as are most epoxy adhesives. However, if the coating is allowed to stand for a while after application, so that the solvent volatilizes and the adhesive is cured, and if this product is then put under reduced pressure and returned to normal pressure at a medium temperature of 50 to 70° C., the phenol resin left behind after solvent volatilization will also melt and change into a viscous liquid with a viscosity of about 10 Pa seconds, so any air on the metal textured surface can be removed.

Although unsaturated polyester adhesives are not available on the market, there are many kinds of commercially available unsaturated polyester components that are used to produce glass fiber reinforced plastics (hereinafter referred to as GFRP) and organic peroxides that are admixed to these for curing under heating are also on the market. If the two are mixed in a suitable recipe, gelling and solidification will proceed as the temperature rises, without the gelling occurring right away, so such a blend can substantially be used as a one-component thermosetting adhesive.

The metal alloys discussed above are not the only adherends that can be bonded to a metal alloy. When a phenol resin-based adhesive is used as the adhesive, then friction materials and grinding materials comprising a matrix of phenol resin will also be bonded readily and when an epoxy adhesive is used for the adhesive, a carbon fiber reinforced plastic (hereinafter referred to as CFRP) comprising a matrix of epoxy resin will also be bonded readily.

Also, when an unsaturated polyester resin-based adhesive is used for the adhesive, a GFRP comprising a matrix of an unsaturated polyester resin will also be bonded readily. With all of these, a metal alloy piece that has been coated with an adhesive is brought into contact with a prepreg and fixed and these are heated and cured in this situation to solidify both the adhesive and the prepreg, allowing a composite to be obtained in which a metal alloy and a fiber reinforced plastic (hereinafter referred to as FRP) are securely bonded and integrated (see PCT/JP 2008/054539: Patent Document 10, PCT/JP 2008/057309: Patent Document 11, PCT/JP 2008/056820: Patent Document 12, PCT/JP 2008/057131: Patent Document 13, PCT/JP 2008/057922: Patent Document 14 or PCT/JP 2008/059783: Patent Document 15).

Similar technology related to injection joining that involves the use of a metal alloy and a thermoplastic resin was reported in the past (Patent Document 3). It will be stated here that the technology discussed in Patent Document 3 is not injection joining technology but rather technology that utilizes the relation between the linear expansion of a metal and the molding shrinkage of a resin.

As shown in Patent Document 3, if injection molding of a thermoplastic resin is performed around a peripheral component through which a metal rod-shaped substance has been passed, when the molded article is taken out of the mold and allowed to be cooled, the metal rod is fastened by the resin molded part. The reason for this is that the linear expansion of a metal such as an aluminum alloy, a magnesium alloy or a copper alloy is at most 1.7 to $2.5 \times 10^{-5}$ C.-1 and, even if the metal is taken out of the mold and cooled to room temperature, the shrinkage is only 0.2 to 0.3% (linear expansion× about 100° C.).

However, the molding shrinkage of the resin is about 1% with PPS and 0.5% for glass fiber-containing PPS and, even for a resin in which the amount of filler has been increased, after injection molding the resin component will always shrink more than the metal portion. Therefore, if a shaped article in which there is a metal part in the middle and this part extends through the resin component is produced by injection molding with an insert, an integrated product can be manufactured with which the metal part is not likely to come loose because of the fastening effect of the molding shrinkage of the resin.

This method for manufacturing a fastening type of integrated article of metal and resin is known conventionally and the handle of a kerosene heater is an example of a similar molded article. A thick wire made of iron and having a diameter of about 2 mm is inserted into a metallic mold for injection molding and a heat-resistant resin or the like is injected. The wire has been given jagged marks (knurling) so that the resin will stay in place. Patent Document 3 is characterized by the fact that the method for texturing is changed from a physical method to a chemical method and is therefore neater, with the texturing being somewhat finer and that the gripping effect is enhanced by the generous use of a resin that is both hard and crystalline. Actually, it is stated in Patent Document 3 that gas leakage occurring along the metal rod is greatly suppressed by the disclosed technology but no mention is made of joining strength.

Meanwhile, with the inventions by the present inventors disclosed in Patent Document 1 and Patent Documents 4 to 8, there is no need at all for a resin fastening effect. A powerful force is necessary to break a molded article in which two flat pieces have been joined together. Another major feature of the technique for increasing joining strength according to the present invention is the use of a high-hardness crystalline resin composition that crystallizes and solidifies over a longer period of time during quenching.

To maintain a metal and a thermoplastic resin in a joined state stably over an extended period, it is actually necessary for the linear expansion coefficient of the two to be close to each other. The linear expansion coefficient of a thermoplastic resin composition can be lowered considerably by adding a large quantity of glass fiber, carbon fiber or another such reinforcing fiber, that is, filler.

Examples of using common steel materials are given in the above-mentioned Patent Documents 8 and 15. The inventors have subjected cold rolled steel, hot rolled steel and the like, which are the most common structural steel materials, to surface treatment so as to be suited to injection joining and adhesive joining or, in other words, suited to the new NMT theory and the NAT theory. This was all well in itself but some of the building material industry did not exhibit the expected interest in these inventions and the inventors were advised to develop something else in the first place for outdoor housing materials applications involving the envisioned integration of a GFRP material and steel.

Zinc-plated steel and aluminum-plated steel sheets are used in building material applications where the material needs to be maintenance free for 10 to 20 years and precoated steel sheets (also called colored steel sheets), in which one, two or in some cases three coats of baked-on finish are added to these steel sheets and so forth, have come to be used in large quantities because of their corrosion resistance and suitability to after-working. Also, because aluminum-plated steel sheets have excellent corrosion resistance at high temperatures, they are used not only in the above applications but also in heater covers, high-temperature gas exhaust pipes and the like. Because of this, the inventors conducted research and development into zinc-plated steel and aluminum-plated steel sheets in addition to ordinary steel materials.

At this time, the inventors conducted research and development to find out if the joining strength between an aluminum-plated steel sheet and an upper coating layer could be further improved by applying the NAT theory, if high adhesive strength could be obtained that was unattainable in the past with epoxy adhesives, phenol resin adhesives and unsaturated polyester resin adhesives that were the original object of the NAT theory, if injection joining would be possible with PBT and PPS resins according to the new NMT theory and so forth.

The present invention was the result of research and development that was important in terms of proving the above-mentioned NMT theory, new NMT theory and NAT theory, but the conclusion came as a surprise. Specifically, while the object of the present invention was completely attained, the surface configuration of the treated aluminum-plated steel sheet that achieved this object was different from the conditions required by the NMT theory, new NMT theory and NAT theory. This can be understood from FIGS. 13 and 14, which show the results of electron microscope observation. This hard-to-define surface configuration is the second one for the inventors, after an α-β titanium alloy.

However, although unlike the product by surface treatment according to the NMT theory and the new NMT theory of an extension-use aluminum alloy for which a simple photographic image is obtained, the large, white three-dimensional objects have a complex shape having an undercut structure. With the small texturing on the plain, if an amine compound has been adsorbed, the injected resin would probably penetrate into and securely solidify in the gaps formed by the recesses and the bases of the convex components, just as predicted by the NMT theory. Consequently, although different from the surface configuration defined in the NMT theory, new NMT theory and NAT theory, the result was configuration with something similar could be expected to be obtained.

Thus, what is currently wanted is related to a practical technique for obtaining a product in which a steel sheet and a resin are tightly integrated by injection joining of a thermoplastic resin composition to an aluminum-plated steel sheet material, by pressure welding of a molded thermoplastic resin composition to an aluminum-plated steel sheet material or by adhesively bonding either two aluminum-plated steel sheet materials together or an aluminum-plated steel sheet material and another adherend, as well as to further improvement of the corrosion resistance of an aluminum-plated steel sheet by coating an aluminum-plated steel sheet and obtaining a tightly bonded coating film.

If a composite could be manufactured in which an aluminum-plated steel sheet and a molded resin were tightly integrated, it could be used advantageously in building material-related parts that are mainly intended for use outdoors. Also, if a corrosion resistant coating layer could be strongly bonded to an aluminum-plated steel sheet, then not only would this help increase the corrosion resistance of the aluminum-plated steel sheet but it would also serve to improve the performance of a precoated steel sheet in which the aluminum-plated steel sheet was used.

SUMMARY OF THE INVENTION

It is an object of the present invention to provide a technique with which these problems can be solved.

The present invention was conceived in an effort to solve the above problems and the composite of steel and resin according to the first aspect of the present invention is formed, without the use of any adhesive agent, by direct joining between a shaped steel sheet, which has a configuration in which three-dimensional protrusions having a pebble-like shape with a diameter of at least about 0.3 µm or having an irregular shape with a minor diameter of at least 0.3 µm and a major diameter of at least several microns are scattered over a plain-like part, which has a surface configuration in which 30 to 50% of the surface area of the plain-like part is accounted for by a portion covered with shallow recesses with a diameter of 20 to 50 nm in a state of being distributed adjacent to each other on the plain-like part, and in which the surface of the three-dimensional protrusions is mainly a ceramic containing silicon and the plain-like part is mainly a ceramic containing aluminum, the shaped steel sheet being obtained by subjecting an aluminum-plated steel sheet to a specific chemical reaction; and a molded article of resin composition whose main component is a hard, crystalline thermoplastic resin.

A composite of steel and resin according to the second aspect of the present invention comprises: a shaped steel sheet, which has a configuration in which three-dimensional protrusions having a pebble-like shape with a diameter of at least about 0.3 µm or having an irregular shape with a minor diameter of at least 0.3 µm and a major diameter of at least several microns are scattered over a plain-like part, which has a surface configuration in which 30 to 50% of the surface area of the plain-like part is accounted for by a portion covered with shallow recesses with a diameter of 20 to 50 nm in a state of being distributed adjacent to each other on the plain-like part, and in which the surface of the three-dimensional protrusions is mainly a ceramic containing silicon and the plain-like part is mainly a ceramic containing aluminum, the shaped steel sheet being obtained by subjecting an aluminum-plated steel sheet to a specific chemical reaction; an adhesive layer in which a one-component thermosetting adhesive has been cured; and an adherend that is a shaped metal alloy or resin that has been joined to the shaped steel sheet by the adhesive layer therebetween.

A corrosion resistant steel material according to the third aspect of the present invention includes at least: a shaped steel sheet, which has a configuration in which three-dimensional protrusions having a pebble-like shape with a diameter of at least about 0.3 µm or having an irregular shape with a minor diameter of at least 0.3 µm and a major diameter of at least several microns are scattered over a plain-like part, which has a surface configuration in which 30 to 50% of the surface area of the plain-like part is accounted for by a portion covered with shallow recesses with a diameter of 20 to 50 nm in a state of being distributed adjacent to each other on the plain-like part, and in which the surface of the three-dimensional protrusions is mainly a ceramic containing silicon and the plain-like part is mainly a ceramic containing aluminum, the shaped steel sheet being obtained by subjecting an aluminum-plated steel sheet to a specific chemical reaction; and a coating film layer in which a one-component thermosetting coating material has been cured.

A composite of steel and resin according to the fourth aspect of the present invention is formed by direct joining between a shaped steel sheet, which is based on an aluminum-plated steel sheet and which is formed by a chemical reaction including at least a step of chemical etching with a weakly basic aqueous solution with at least a pH of 9 to 11 and in which the average length of profile curve elements (RSm) is 3 to 20 µm and the maximum height roughness (Rz) is 1 to 8 µm; and a molded article of resin composition whose main component is a hard, crystalline thermoplastic resin.

A composite of steel and resin according the fifth aspect of the present invention comprises: a shaped steel sheet, which is based on an aluminum-plated steel sheet and which is formed by a chemical reaction including at least a step of chemical etching with a weakly basic aqueous solution with at least a pH of 9 to 11 and in which the average length of profile curve elements (RSm) is 3 to 20 µm and the maximum height roughness (Rz) is 1 to 8 µm; an adhesive layer in which a one-component thermosetting adhesive has been cured; and an adherend that is a shaped metal alloy or resin that has been joined to the shaped steel sheet by the adhesive layer therebetween.

A corrosion resistant steel material according to the sixth aspect of the present invention includes at least: a shaped steel sheet, which is based on an aluminum-plated steel sheet and which is formed by a chemical reaction including at least a step of chemical etching with a weakly basic aqueous solution with at least a pH of 9 to 11 and in which the average length of profile curve elements (RSm) is 3 to 20 µm and the maximum height roughness (Rz) is 1 to 8 µm; and a coating film layer in which a one-component thermosetting coating material has been cured.

The composite of steel and resin according to the seventh aspect of the present invention is the composite of steel and resin according to any one of the first or fourth aspect, wherein the hard, crystalline thermoplastic resin is a resin composition whose main component is any of a polybutylene terephthalate resin, a polyphenylene sulfide resin, a polyamide resin or a liquid crystal polymer.

The composite of steel and resin according to the eighth aspect of the present invention is the composite of steel and resin according to any one of the first or fourth aspect, wherein the resin composition whose main component is a hard, crystalline thermoplastic resin is any of a first resin composition whose main component is a polybutylene terephthalate resin, a second resin composition whose main component is a polyphenylene sulfide resin or a third resin composition whose main component is an aromatic polyamide resin, and the resin component of the first resin composition is a resin composition in which a polybutylene terephthalate resin is a main component and a polyethylene terephthalate resin and/or a polyolefin resin is a minor component, the resin component of the second resin composition is a resin composition in which a polyphenylene sulfide resin is a main component and a polyolefin resin is a minor component and the resin component of the third resin composition is a resin composition in which an aromatic polyamide resin is a main component and an aliphatic polyamide resin is a minor component.

The composite of steel and resin according to the ninth aspect of the present invention is the composite of steel and resin according to the eighth aspect, wherein the first resin composition contains the polybutylene terephthalate resin by 70 to 97 wt % and the polyethylene terephthalate resin and/or the polyolefin resin by 3 to 30 wt %.

The composite of steel and resin according to the tenth aspect of the present invention is the composite of steel and resin according to the eighth aspect, wherein the second resin composition contains the polyphenylene sulfide resin by 70 to 97 wt % and the polyolefin resin by 3 to 30 wt %.

The composite of steel and resin according to the 11-th aspect of the present invention is the composite of steel and resin according to any one of the second or fifth aspect, wherein the thermosetting adhesive is an adhesive based on a phenol resin, an epoxy resin or an unsaturated polyester.

The composite of steel and resin according to the 12-th aspect of the present invention is the composite of steel and resin according to any one of the second or fifth aspect, wherein the resin adherend is a polishing compound or a friction material composition containing a phenol resin, a fiber-reinforced plastic containing an epoxy resin or a fiber-reinforced plastic containing an unsaturated polyester resin.

The corrosion resistant steel material according to the 13-th aspect of the present invention is the corrosion resistant steel material composite of steel according to any one of the third or sixth aspect, wherein the main component of the thermosetting coating material is an epoxy resin.

The steel material or the composite of steel and resin according to the 14-th aspect of the present invention is the steel material or the composite of steel and resin according to any one of the first to 13-th aspect, wherein the thermoplastic crystalline resin composition, the thermosetting adhesive or the thermosetting coating material contains at least one type of filler by 0 to 60 wt % selected from among glass fiber, carbon fiber, aramid fiber, carbon nanotubes, other reinforcing fibers, calcium carbonate, magnesium carbonate, silica, talc, clay and glass powder.

A method for manufacturing a composite of steel and resin according to the 15-th aspect of the present invention comprises a shaping step of shaping an aluminum-plated steel sheet by mechanical working; a step of chemically etching the shaped steel material with an acidic or basic aqueous solution; a step of finely etching the treated steel material with a weakly basic aqueous solution having a pH of 9 to 11; a step of separately obtaining a molded resin from a polybutylene terephthalate resin a polyphenylene sulfide resin, a polyamide resin, or a resin composition whose main component is a liquid crystal polymer by a resin molding method represented by injection molding; a heating step of heating the steel material that has gone through the chemical reaction steps to a temperature of at least the melting temperature of the resin composition; and a joining step of pressing the molded resin against the heated steel material thereby to performing pressure welding of the two.

A method for manufacturing a composite of steel and resin according to the 16-th aspect of the present invention comprises: a shaping step of shaping an aluminum-plated steel sheet by mechanical working; a step of chemically etching the shaped steel material with an acidic or basic aqueous solution; a step of finely etching the treated steel material with a weakly basic aqueous solution having a pH of 9 to 11; an insertion step of inserting the steel material that has undergone the chemical reaction steps into a metallic mold for injection molding; and an injection joining step of integrating the steel material with the resin composition by injecting a first resin composition, in which a polybutylene terephthalate resin is a main component and a polyethylene terephthalate resin and/or a polyolefin resin is a minor component, a second resin composition, in which a polyphenylene sulfide resin is a main component and a polyolefin resin is a minor component, or a third resin composition, in which an aromatic polyamide resin is a main component and an aliphatic polyamide resin is a minor component, onto the inserted steel material.

A method for manufacturing a composite of steel and resin according to the 17-th aspect of the present invention comprises: a shaping step of shaping an aluminum-plated steel sheet by mechanical working; a step of chemically etching the shaped steel material with an acidic or basic aqueous solution; a step of finely etching the treated steel material with a weakly basic aqueous solution having a pH of 9 to 11; a step of coating the steel material that has undergone the chemical reaction steps with a one-component thermosetting adhesive; a step of pressing an adherend made of metal or of an uncured thermosetting resin against the steel material that has been coated with the adhesive, thereby fixing the two together; and a curing and bonding step of heating the temporarily integrated components and thereby curing both the adhesive component and the adherend.

A method for manufacturing a composite of steel and resin according to the 18-th aspect of the present invention comprises: a shaping step of shaping an aluminum-plated steel sheet by mechanical working; a step of chemically etching the shaped steel material with an acidic or basic aqueous solution; a step of finely etching the treated steel material with a weakly basic aqueous solution having a pH of 9 to 11; a step of coating the steel material that has undergone the chemical reaction steps with a one-component thermosetting adhesive; a step of implementing adhesive permeation by placing the steel material coated with the adhesive into a sealed container, reducing the pressure and then applying pressure; a step of pressing an adherend made of metal or of an uncured thermosetting resin against the steel material that has been coated with the adhesive, thereby fixing the two together; and a curing and bonding step of heating the temporarily integrated components and thereby curing the adhesive component.

A method for manufacturing a corrosion resistant steel material according to the 19-th aspect of the present invention comprises at least: a shaping step of shaping an aluminum-plated steel sheet by mechanical working; a step of chemically etching the shaped steel material with an acidic or basic aqueous solution; a step of finely etching the treated steel material with a weakly basic aqueous solution having a pH of 9 to 11; and a step of coating the steel material that has undergone the chemical reaction steps with a one-component thermosetting coating material and then curing.

A method for manufacturing a corrosion resistant steel material according to the 20-th aspect of the present invention comprises at least: a shaping step of shaping an aluminum-plated steel sheet material by mechanical working; a step of chemically etching the shaped steel material with an acidic or basic aqueous solution; a step of finely etching the treated steel with a weakly basic aqueous solution having a pH of 9 to 11; a step of coating the steel material that has undergone the chemical reaction steps with a one-component thermosetting coating material; a step of implementing coating permeation by placing the steel material coated with the coating material into a sealed container, reducing the pressure and then applying pressure; and a curing step of heating and curing the steel.

The method for manufacturing a steel material or a composite of steel and resin according to the 21-th aspect of the present invention is the method for manufacturing a steel material or a composite of steel and resin according to any one of the 15-th to 20-th aspect, wherein the aqueous solution used for the fine etching has a temperature between normal temperature and 70° C. and the basic substance that is added is selected from among hydrazine hydrate, ammonia and water-soluble amine compounds.

The composite of the present invention is one in which a thermoplastic resin composition and an aluminum-plated steel sheet part are integrated so that they will not readily separate. A composite can be manufactured in which a thermoplastic resin composition having a resin component containing PBT by 70 to 97 wt % and PET and/or polyolefin resin by 3 to 30 wt %, a thermoplastic resin composition having a resin component containing PPS by 70 to 97 wt % and polyolefin resin by 3 to 30 wt % or a thermoplastic resin composition having a resin component containing both an aromatic polyamide and an aliphatic polyamide is strongly joined by injection joining to an aluminum-plated steel sheet part that has undergone the surface treatment according to the present invention.

Also, with the composite of the present invention, first a molded resin is produced by injection molding from a thermoplastic resin composition containing PBT, PPS, polyamide, liquid crystal polymer or the like and meanwhile an aluminum-plated steel sheet part is subjected to the surface treatment of the present invention. The steel sheet that has undergone this surface treatment is then heated. The previously prepared molded resin is pressed against the heated steel sheet and welded under pressure to manufacture a metal-resin composite.

Also, with the composite according to the present invention, a one-component thermosetting adhesive and an aluminum-plated steel sheet are bonded extremely tightly together. A metal-resin composite, in which an aluminum-plated steel sheet part and a CFRP or a GFRP, an aluminum-plated steel sheet part and another metal alloy part or two aluminum-plated steel sheet parts are strongly bonded together, can be manufactured by using a commercially available epoxy adhesive or the like on an aluminum-plated steel sheet part that has undergone the surface treatment according to the present invention.

Furthermore, taking advantage of the fact that a one-component thermosetting coating material and an aluminum-plated steel sheet can be bonded extremely tightly together, the present invention improves the performance of aluminum-plated steel sheets and precoated steel sheets with excellent corrosion resistance.

DETAILED DESCRIPTION OF PREFERRED EMBODIMENTS

Figure 1:
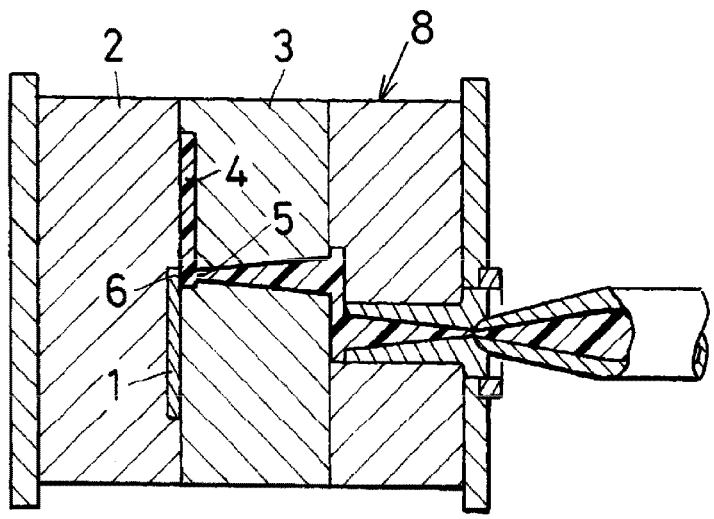
FIG. 1 is view of mold configuration schematically illustrating the process of manufacturing a composite of a metal and a resin by injection joining.

The composite of steel and resin and the method for manufacturing the same according to the present invention will now be described, breaking it down into the features of the steel and resin composite and its manufacturing method, manner of joining and working examples.

(A) FEATURES OF THE STEEL AND RESIN COMPOSITE AND ITS MANUFACTURING METHOD

(a) Aluminum-Plated Steel Sheet Material

The steel sheet material referred to in the present invention is more specifically a molten aluminum alloy-plated steel sheet and nearly all the products are sold by steel makers in Japan and abroad under the name of "aluminum-plated steel sheet." The usual method for manufacturing this steel is to use a coiled steel sheet material as the raw material, continuously to immerse and pass this through a high-temperature tank containing a molten aluminum alloy and then to wind the strip again. Therefore, the term "steel sheet" is often used in the description of the invention as well, while of course the present invention also applies to steel in other shapes obtained by immersion in a molten aluminum alloy.

The aluminum alloy used in the process of manufacturing the aluminum-plated steel sheet contains silicon in addition to aluminum and also contains a certain amount of iron. Specifics can be found in catalogs and technical literature, while in an example of elemental analysis performed on the aluminum surface layer of a commercially available aluminum-plated steel sheet, the metal content was 77% for aluminum, 8% for silicon and 15% for iron. The silicon facilitates production of an intermediate layer between the surface aluminum layer and the steel that is the base material and, as a result, the joint strength between the steel and the aluminum alloy layer is said to be high.

The inventors are not manufacturers of aluminum-plated steel sheets and do not know whether the iron atoms revealed in the above-mentioned analysis were contained in the molten aluminum alloy to start with, whether they migrated from the steel after immersion in the molten aluminum alloy, whether iron from both was mixed or how far into the plating layer the analysis itself extended. Further, the inventors themselves did not perform XPS surface analysis on the aluminum-plated steel sheet raw material and therefore do not have a detailed image about whether the iron atoms reach all the way to the surface, whether there is a substantially uniform iron content of 10% or more including the surface, for example.

Specifically, the question is whether the iron content is close to being uniform or is gradient from the bottom to the top of the layer between a thickness of 50 and 100 μm of the plating layer and, if it is a gradient, then there should be more migration of iron atoms to the surface the longer is the high-temperature hysteresis time during manufacture or the longer is the elapsing time after manufacture. With this in mind, it seems possible that the surface treatment method will depend on the product history. Consequently, the aluminum-plated steel sheet used in the experiments by the inventors was one that was no older than six months since its manufacture by a Japanese manufacturer.

If the discussion is about adhesion joining or injection joining of a resin to a steel sheet whose surface layer is an aluminum alloy having a composition close to that of an extension-use aluminum alloy, which is an aluminum alloy with an extremely low content of iron and silicon, by electroplating, explosive bonding or another such means to a steel material, then the reader should refer to the previously disclosed patents related to aluminum alloys themselves, namely, Patent Documents 1, 2, 3, 9, 10 and so forth, rather than the present invention.

(b) Surface Treatment of Steel Material

To obtain a metal alloy according to the new NMT theory or NAT theory, that is, to obtain a surface which satisfies the above-mentioned conditions (1) to (3), the following four steps are basically to be subjected to: 1) degreasing, 2) chemical etching, 3) fine etching and 4) surface curing. Also, to obtain an aluminum alloy according to the NMT theory, the following three steps are basically to be subjected to: 1) degreasing, 2) chemical etching and 3) fine etching. What the present invention deals with is an aluminum-plated steel sheet, so a surface treatment method was selected, in which the NMT theory is employed, and the surface configuration conforms to the new NMT theory, so that coarse (micron-order) texturing is present. In view of this, the three steps of 1) degreasing, 2) chemical etching and 3) fine etching will be discussed in specific terms.

Working oil and fingerprints generally adhere to metal alloy parts that have undergone machining or the like, so degreasing is a step in which the parts are immersed in an aqueous solution containing a surfactant and then rinsed with water. A common metal degreaser in which a surfactant is dissolved is preferable for degreasing. Specifically, an aluminum degreaser, a magnesium alloy degreaser, an iron degreaser, a stainless steel degreaser or the like can be used favorably.

The chemical etching that is then performed preferably makes use of an aqueous solution of a strong base such as caustic soda or an aqueous solution of a non-oxidative acid such as a halogen acid. Either an acid or a base may be used, while it is preferable to use both, one after the other. Specifically, there is a certain induction period until the etching reaction really begins once the steel that has undergone the above step is immersed in either an acidic solution or a basic solution. This is because the outermost layer of the aluminum-plated steel sheet is covered with a natural oxidation layer of the aluminum alloy. Therefore, the induction period varies with the natural oxidation layer, which means that it is difficult to obtain a consistent etching level even though an acidic or basic aqueous solution of a specific concentration and a specific temperature is used.

As can be understood by considering a case in which the material is first immersed for a short length of time in a basic aqueous solution and rinsed with water and then immersed for a specific length of time in an acid aqueous solution and rinsed with water, the first immersion and rinsing are considered to be preliminary base washing, the purpose of which is to cause a basic substance to be adsorbed to the aluminum alloy surface. If a basic substance has been adsorbed, then the subsequent etching with an acid aqueous solution will begin with substantially no induction period. The same applies to the reverse. In other words, it is preferable to start the etching step after preliminary washing.

Specific examples of the etching step are given in experiment examples, in which the acid and base concentrations of the etching solution, the solution temperature and the immersion time are adjusted and general conditions are sought at which the mean length of profile element RSm is 1 to 10 lam for a roughness profile according to JIS (Japan Industrial Standards) B 0601:2001 (ISO 4287) in roughness observation with a scanning probe microscope and the maximum profile element height for a roughness profile, in other words, the maximum height of roughness profile Rz is 0.5 to 5 μm for the roughness profile.

However, even after a careful examination of the actual etching conditions for an aluminum-plated steel sheet, the inventors could not quite obtain the expected roughness as discussed above. In view of this, rather than using roughness as an index, the inventors decided to use, as an index, injection joining strength, with which integrated test piece is taken as good when its breaking strength obtained through the performed injection joining test using a PPS resin (discussed below) is high, thus performed roughness measurement on samples with a high injection joining strength.

Figure 13:
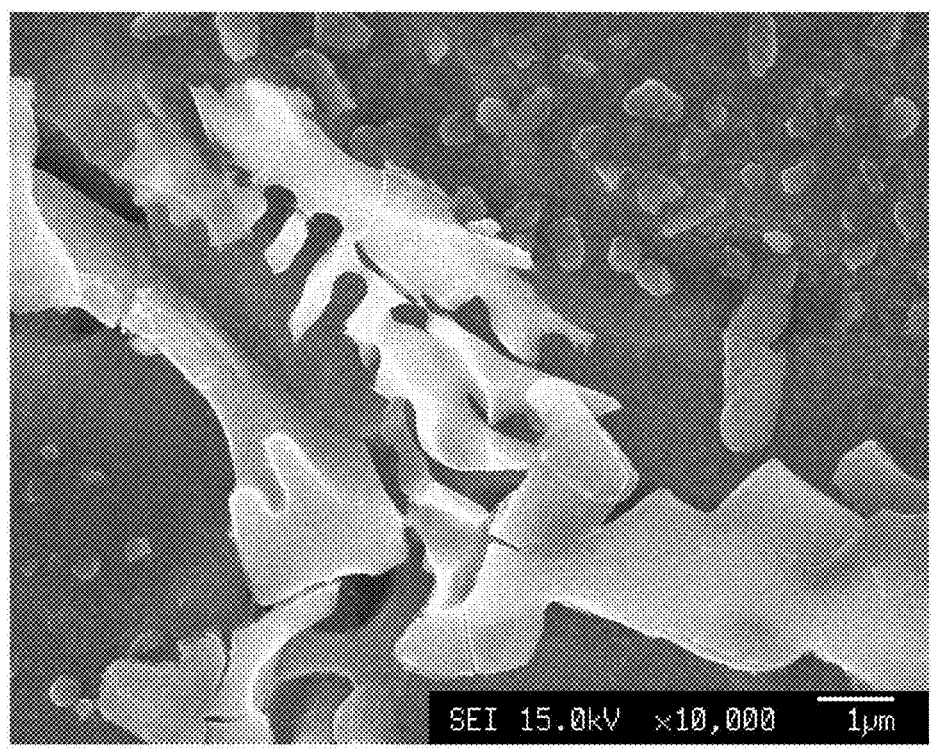
FIG. 13 is an electron micrograph (magnification of 10,000 times) of the surface of an aluminum-plated steel sheet MSA120 (made by Nissin Steel, Tokyo, Japan) obtained by performing a surface treatment using a caustic soda aqueous solution as an etchant and using a hydrazine monohydrate aqueous solution as a fine etchant.

As a result, nearly all the samples had an RSm between 3 and 20 μm and an Rz between 1 and 8 μm. This is considerably larger than the expected roughness. The reason was unclear and, when several samples were examined under an electron microscope, the surface configuration came as a complete surprise. One such example is shown in FIG. 13, which is quite distinct from the electron micrograph when an extension-use aluminum alloy was treated. This will be discussed in greater detail below.

As mentioned above, it is preferable to subsequently immerse the material for a few minutes in a weak nitric acid aqueous solution both when preliminary base washing and acid etching were performed and when preliminary acid washing and base etching were performed. Immersion in a nitric acid aqueous solution with a concentration of just a few percent has almost no effect on coarse texturing on the surface (the micron-order texturing obtained above), while it does sweep away halogen ions or sodium ions that had adhered due to the influence of the previous step. If these ions remain near the aluminum alloy, they often promote corrosion of the aluminum alloy, although this is from a long-term viewpoint. Consequently, these ions are preferably eliminated by immersion in a nitric acid aqueous solution and rinsing with water.

Next, the material is preferably immersed in an aqueous solution containing hydrazine, ammonia or a water-soluble amine to perform fine etching. The results of experiments conducted using these revealed that the objective can be attained by immersion for 1 to 30 minutes in an aqueous solution with a pH of 9 to 11, between normal temperature and 70° C. Aqueous ammonia can only be used at normal temperature because of its strong odor, and even if it is used at the highest concentration of about 25%, the immersion still takes 20 to 30 minutes. This is because the basicity is rather weak.

It is the opinion of the inventors that using hydrazine monohydrate is best. It is preferable that the aqueous solution has a concentration of a few percent, the temperature is 50 to 60° C. and the pH is about 9.5 to 10.2. Then, the odor will also be milder. Immersion in a weakly basic aqueous solution such as this results in the aluminum-rich surface being finely etched so that it is entirely covered with recesses 30 to 50 nm in diameter and results in the amine compound that is used (hydrazine in this case) being chemically adsorbed to the surface at the same time.

Figure 14:
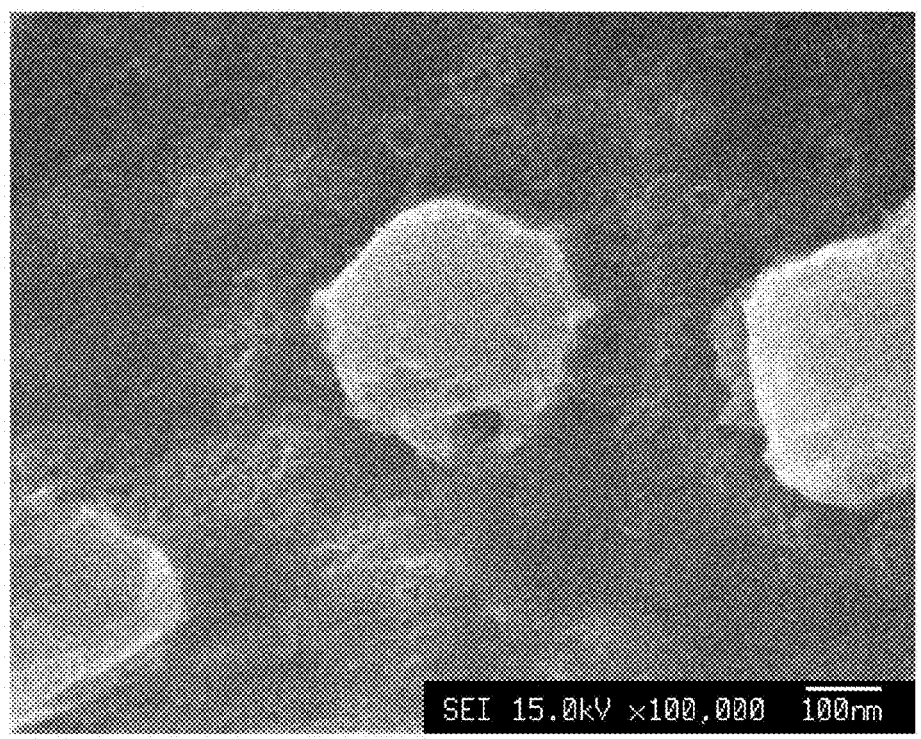
FIG. 14 is an electron micrograph (magnification of 100,000 times) of the surface of an aluminum-plated steel sheet MSA120 (made by Nissin Steel Co., Ltd., Tokyo, Japan) obtained by performing a surface treatment using a caustic soda aqueous solution as an etchant and using a hydrazine monohydrate aqueous solution as a fine etchant.

Of the products of this step, ones with excellent injection joining strength were selected and examined with an electron microscope. One of these is shown in FIGS. 13 and 14, with FIG. 13 being an electron micrograph in magnification of 10,000 time, and FIG. 14 in magnification of 100,000 times. FIG. 13 shows a strange surface consisting of a plain over which very large three-dimensional objects and many smaller pebble-like objects are scattered.

Based on separate analysis of EDX function by analytical electron microscopy, the pebbly shapes and large clumps that are white and have a hard-to-express three-dimensional shape in the photos contain a large quantity of silicon, a small quantity of aluminum and a trace amount of iron and therefore seem to be made of a silicon oxide-based ceramic that mainly contains silicon. When the plain was subjected to EDX analysis, the aluminum image was darkest and silicon and iron were also observed, so the surface seems to be a ceramic layer whose main component is aluminum oxide. It can be seen in FIG. 14, which is a detail view of the plain, in addition to the pebbles there are circular shapes with a diameter of 30 to 50 nm which do not cover the entire surface but do account for about one-third of the surface area.

When the surface was analyzed with XPS, nitrogen atoms were observed, albeit only a few, and it was found that the amine compound used in the fine etching treatment (namely, hydrazine in this case) was chemically adsorbed just as when a common aluminum alloy underwent NMT treatment. In the NMT liquid treatment of a common aluminum alloy, amine-based molecules are seen to be chemically adsorbed to trivalent aluminum atoms on the surface, so it is surmised that they are adsorbed to the portion that looks like a plain on this surface.

The inventors performed injection joining of a PPS resin (the PPS composition (1) in Preparation Example 1 of the working examples) to an aluminum-plated steel sheet that had been subjected to surface treatment and measured the joint strength of the product thus obtained. The roughness of the aluminum-plated steel sheets that had adequate joint strength in these experiments was measured with scanning probe microscope. As a result, it was found that good injection joining strength is obtained when the profile element mean length RSm is 3 to 20 μm and the maximum height roughness Rz is 1 to 8 μm. To repeat, these are different from the ranges mentioned before by the inventors with the new NMT theory and the NAT theory. This is a phenomenon that is characteristic of an aluminum-plated steel sheet, as should be clear from the above discussion.

With the above-mentioned aluminum-plated steel sheet, it is very likely that what plays the role of spikes as claimed in the new NMT theory and the NAT theory is the silicon compound portion that bulges out as large three-dimensional shapes or the silicon compound portion that sticks out in pebble shapes, while this role also seems to be filled to a certain extent by the fine texturing with a diameter of 30 to 50 nm on the plain. The fine texturing with the greatest spike effect as expected from the past experience of the inventors has an overall period of 50 to 100 nm and, when FIG. 13 is viewed in this light, the fine texturing becomes a bit more prominent. However, the portion that sticks out vertically, such as the silicon compound part, is also believed to have a significant effect because of the complex shape of this portion.

The "new NMT" is generally held to be as follows. If the fine texturing is too fine (a period of about 10 nm), then when viewed from the resin side the surface will appear extremely smooth, so there will tend to be little spike effect, while if the fine texturing has a period greater than 300 nm (in which case the period or diameter of large recesses on the micron order will probably be as large as 10 μm or more), there will be a sharp drop in the number of spikes present on the inner wall surfaces of the micron-level recesses, so again the effect will tend to be minimized. When FIG. 13 is viewed in this light, the fine texturing should at least be neither too small nor have a period of over 500 nm and be too large. Although unusual, this configuration seems suited to injection joining.

Let us discuss what is known about ordinary aluminum alloys from XPS analysis. When a commercially available extension-use aluminum alloy is subjected to XPS analysis, with the focus on the aluminum atoms, trivalent aluminum atoms and zero-valent aluminum atoms are detected in a ratio of from 2:1 to 3:1. With XPS, atoms can be detected down to a depth of 1 to 2 nm from the surface, so the fact that zero-valent aluminum atoms could be detected, even though it may be in a small quantity, indicates that the thickness of this natural oxidation layer (layer of aluminum oxide) is around 1 nm.

Meanwhile, in analysis of an aluminum-plated steel sheet that had undergone the above-mentioned surface treatment, all of the aluminum atoms were trivalent. This means that the thickness of the natural oxidation layer of the aluminum is at least 2 nm, which is greater than the thickness of the natural oxidation layer of a commercially available aluminum alloy such as A5052. Because of this, it can be said that both the white parts and the plain parts of the surface layer of the treated aluminum-plated steel sheet are, on the whole, covered with a hard ceramic substance when viewed with an electron microscope, so the chemical conditions for the surface layer of a metal alloy as stated in the new NMT theory and the NAT theory are satisfied.

(c) Thermoplastic Resin Composition for Injection Joining

This resin composition refers to a first resin composition whose main component is PBT, which is a crystalline resin, a second resin composition whose main component is PPS or a third resin composition whose main component is an aromatic polyamide, which is directly joined to the above-mentioned aluminum-plated steel sheet by injection molding.

The resin component of the first resin composition is a resin composition in which PBT is the main component and PET and/or a polyolefin resin is a minor component. The resin component of the second resin composition is a resin composition in which PPS is the main component and a polyolefin resin is a minor component. The resin component of the third resin composition is a resin composition in which an aromatic polyamide is the main component and an aliphatic polyamide is a minor component.

It is good if the first resin composition contains PBT by 70 to 97 wt % and PET and/or polyolefin resin by 3 to 30 wt %, the second resin composition contains PPS by 70 to 97 wt % and polyolefin resin by 3 to 30 wt % and the third resin composition contains aromatic polyamide by 50 to 100% and aliphatic polyamide by 0 to 50%. There will be large decrease in injection joining strength outside of these ranges.

The high-hardness crystalline resin composition here is preferably PPS or PBT in which one or more types of filler selected from among glass fiber, carbon fiber, aramid fiber and other such reinforcing fibers, calcium carbonate, magnesium carbonate, silica, talc, clay, and glass powder are contained in an amount of 20 to 60 wt % of the total composition. This is because addition of these fillers adjusts the coefficient of linear expansion of the resin composition to the range between 2 and $3 \times 10$-$5°$ C.-1, changes the coefficient of linear expansion closer to that of a metal alloy and keeps the internal stress which occurs at the joining interface during a temperature change in a low level.

(d) Manufacture of Composite/Injection Joining Using Thermoplastic Resin

This composite manufacturing method is an injection molding method, in which a metal alloy part is inserted into a metal mold, and is carried out as follows. A metallic mold for injection molding is readied, the mold is opened, a shaped steel material obtained by the above-mentioned treatment is inserted at one side of the mold, the mold is closed, modified PBT, modified PPS or a modified aromatic polyamide-based thermoplastic resin composition is injected and solidified and then the mold is opened and parted from the molded article to obtain a composite.

The conditions for injection will be described. The temperature of metallic mold for PBT or PPS resin is preferably at least 100° C. and more preferably at least 120° C., since with PBT or PPS resin there is few particular effect on the resin strength after solidification and composite production efficiency will be better. The injection temperature, injection pressure and injection rate are basically the same as those in ordinary injection molding, while, if they were to be specified, it would be better for the injection rate and injection pressure to be on the high side.

(e) Thermoplastic Resin Composition for Pressure Welding

This resin composition can be a resin composition whose main component is a hard, highly crystalline resin. With pressure welding under the new NMT theory, PBT, PPS, aromatic polyamide, aliphatic polyamide, liquid crystal polymer, polyether ether ketone (hereinafter referred to as PEEK) or the like can be used as the resin composition and these same resins can be used with the present invention. The above-mentioned thermoplastic resins for injection joining, namely, PBT, PPS and aromatic polyamide resins modified for use in injection joining can of course be used. In other words, the range is broader than just the above-mentioned thermoplastic resins for injection joining and any hard, highly crystalline resin can be used. PBT, PPS and aromatic polyamide resins and the like are particularly favorable because their melting points are not too high.

Resin compositions in which these serve as the resin component may contain one or more types of filler selected from among glass fiber, carbon fiber, aramid fiber and other such reinforcing fibers, calcium carbonate, magnesium carbonate, silica, talc, clay and glass powder, in an amount of 20 to 60 wt % of the total composition. With a liquid crystal polymer, the above fillers may be contained in an amount of 0 to 50%. This is because addition of these fillers lowers the coefficient of linear expansion of the resin composition.

(f) Manufacture of Composite/Pressure Welding Using Thermoplastic Resin

The resin component of the resin composition used in this composite manufacturing method is a hard, highly crystalline thermoplastic resin and, more specifically, PBT, PPS, polyamide, a liquid crystal polymer or the like is preferable. The modified PBT, PPS and aromatic polyamide resin compositions, which are said to be favorable for use in injection joining, also fall within this scope and, of course, are favorable for use here. First a molded resin is produced by compounding glass fiber or another filler to obtain a resin composition and then using this as the raw material in an injection molding machine.

Next, the aluminum-plated steel sheet material that has undergone the above surface treatment is caused to have its temperature raised to one above the melting point of the resin composition by use of a hot plate, a hot air dryer or the like and the above-mentioned molded resin is pressed over this heated steel material. The phrase "above the melting point" refers to a temperature that is at most only a few dozen degrees centigrade above the melting point, at which the following work can be carried out.

A favorable work mode will now be discussed. First, the steel sheet part is heated to a predetermined temperature. The heated steel sheet part is transferred onto a heat-insulating board and the molded resin prepared beforehand is pressed onto this steel sheet piece. The bottom surface of the resin part melts, after which the heat is dispersed and the resin recrystallizes and solidifies. During this time the molten resin penetrates into the recesses on the steel sheet surface, after which it is allowed to be cooled and solidify, which joins it to the metal.

To improve the reproducibility of joint strength, the joined material is placed under a vacuum for the few seconds or over 10 seconds while the resin is in molten state, after which it is returned to normal pressure. Pressure welding that is rational and has good reproducibility can be performed by making a suitable pressure welding jig and incorporating a vacuum pump. An example is given in the working examples.

(g) One-Component Thermosetting Adhesive

A thermosetting adhesive that is liquid during application and that contains few huge molecules (gelled molecules) is desirable in view of the NAT theory. To put this in more specific terms, the adhesive needs to penetrate into recesses with a period of a few microns on the surface of the metal (aluminum-plated steel sheet) and also needs to penetrate a certain amount into the fine texturing with a period of a few dozen to a few hundred nanometers present inside these recesses, so the viscosity of the liquid is preferably no more than 19 Pascal-seconds at most.

However, it is also possible to leave the adhesive-coated steel sheet in a vessel heated to 50 to 80° C., such as a heated desiccator, after application and add an operation in which the adhesive-coated steel sheet is put under reduced pressure and returned to normal pressure at the same temperature, so even an adhesive composition in the form of paste, which has a viscosity of a few hundred Pascal-seconds at normal temperature, can be used by heating it to the temperature between 50 and 80° C. to lower the viscosity and put the adhesive in liquid form. However, if gelling of the adhesive or the like should occur during this temperature elevation, the above-mentioned penetration of the adhesive into the gaps of the fine texturing will not so proceed, hence, when a high-viscosity adhesive such as this is used, it will preferably have a high gelling temperature.

By the same token, it is clear that even a two-part thermosetting adhesive will be favorable for use as long as it has a high gelling temperature, gels extremely slowly near normal temperature even after the admixture of the curing agent and is such that the viscosity of the mixture is below what was discussed above. Types of adhesives that can be used include epoxy adhesives, phenol resin adhesives and unsaturated polyester adhesives. Many of the former two types that have excellent adhesive performance are available commercially.

With unsaturated polyester adhesives, an organic peroxide having an extremely high decomposition temperature can be used as a curing agent. Unsaturated polyesters are sorted into those of alkyd types and vinyl ester types, while in terms of adhesion strength itself, it is better to use a vinyl ester type, particularly a vinyl ester type of unsaturated polyester manufactured using an epoxy resin and methacrylic acid.

Epoxy adhesives will now be discussed in further detail. Most of the commercially available one-component epoxy adhesives make use of a bisphenol epoxy resin, a glycidylamine epoxy resin, a polyfunctional polyphenol epoxy resin, an alicyclic epoxy resin or the like as the epoxy resin, to which dicyandiamide or an imidazole is added as a curing agent. These have a relatively low adhesive viscosity, which makes them easier to apply, but their heat resistance is somewhat inferior to that of the type discussed below.

Meanwhile, for an adhesive in which an aromatic amine compound is used as a curing agent, the mixture cannot be produced until it is once melted, because most aromatic amine compounds are solids and, even if a mixture can be obtained, it will be either a solid or a high-viscosity paste at normal temperature. Such adhesives are characterized by good heat resistance after curing but, for the purposes of the present invention, the viscosity is too high, making work after application difficult (the job of making the adhesive permeate into the metal surface). Such an adhesive can be made into a usable adhesive composition by adding a solvent that does not participate in a polymerization reaction whatsoever.

It is also possible to use an acid anhydride for a curing agent and a product of acid anhydrides that is a low viscosity liquid is also produced, so a thermosetting adhesive composed of an epoxy resin and an acid anhydride can be used favorably. Unfortunately, this type of adhesive has not yet appeared on the market. The reason is that gelling proceeds, albeit slowly, when the adhesive is stored at normal temperature after mixing. Therefore, marketing a mixed product is difficult in terms of quality assurance and at present those firms that need adhesives usually purchase an epoxy resin and an acid anhydride, compound the components themselves and use the product in-house.

The gelling or curing temperature of the mixture is most often at least 150° C. and, because the gelling temperature is so high, an epoxy resin compounded with an acid anhydride (an adhesive composition) can be stored for a few days without any problem if kept in a refrigerator. In this sense, an epoxy adhesive to which an acid anhydride is added appears to be a two-part adhesive but with the present invention it is classified as a one-component thermosetting adhesive.

(h) Manufacture of Composite/Adhesion Joining Using One-component Thermosetting Adhesive Epoxy adhesives, phenol resin adhesives and unsaturated polyester adhesives can be used favorably as adhesive agents. There are many commercially available epoxy and phenol resin adhesives that have excellent adhesion performance. They need to be a liquid at the time of application. High-viscosity adhesives that are a solid at normal temperature drop to a viscosity level that can be considered to be a liquid with a viscosity of 10 Pascal-seconds or more when the temperature is adjusted to the range between 50 and 80° C. Utilizing this phenomenon is favorable. Since a high-viscosity adhesive such as this is an epoxy adhesive, some of the main points involved in using an epoxy adhesive will be discussed below.

First, a large vessel such as a desiccator that allows pressure reduction is readied. The vessel is preheated by being left for close to an hour in a warm air dryer. Meanwhile, steel sheet parts that have undergone the above-mentioned surface treatment are readied and painted (coated) at the necessary places with an adhesive. The above-mentioned desiccator is taken out of the warm air dryer, adhesive-coated steel sheets are arranged in the desiccator, the lid is closed and the pressure is reduced with a vacuum pump to the range between a few dozen and a few mmHg. After being left for a while under reduced pressure, they are returned to normal pressure.

The cycle of pressure reduction and returning to normal pressure is further repeated. This procedure causes the adhesive, which has been turned into a liquid by the heat from the desiccator, to be sucked into the recesses on the steel sheet surface. Normally, each steel sheet piece is taken out of the desiccator, attached and affixed to an adherend, then put in a hot air dryer, heated to the range between 100 and 135° C. and held at the temperature from a few dozen minutes to a few hours to promote gelling, after which the temperature is raised to the range between 150 and 200° C. and held at the temperature from a few dozen minutes to a few hours to be cured. The temperature settings will vary greatly with the type of curing agent and the precise temperature will vary with the individual epoxy resin and curing agent type. The key is to arrange so that gelling proceeds smoothly by which good joining is created. If the temperature is raised all at once, runaway gelling and curing will occur, which ends up lowering the adhesive strength.

Using the identical steel sheet as the adherend, two steel sheets can be bonded together. Also, a steel sheet can be bonded to another metal alloy, such as a metal alloy other than the same type of steel produced according to the NAT theory, such as stainless steel produced in accordance with the NAT theory. Also, carbon fiber reinforced plastic (hereinafter referred to as CFRP) is a super-lightweight, high-strength material having a matrix of epoxy resin and, when an uncured CFRP (that is, a CFRP prepreg) and a steel sheet part that has been coated with an epoxy adhesive are connected with a clip together, heated in a hot air dryer in the connected state and the entire epoxy component is cured, the epoxy adhesive and the CFRP solidify substantially simultaneously, producing a tightly integrated article of a steel sheet part and CFRP.

(i) One-Component Thermosetting Coating Material

A coating material which is applied and strongly bonded to an aluminum-plated steel sheet to improve corrosion resistance will now be discussed. Basically any coating material that improves corrosion resistance can be used as long as the coating material is such that, when a curing agent suited to the epoxy resin, phenol resin, unsaturated polyester resin or the like is added and this mixture gels and cures under heating. It is especially favorable to use an epoxy coating material to produce a steel material with the highest corrosion resistance, since epoxy coating materials have the highest adhesive strength and furthermore the adhesive strength of an epoxy coating material is certainly very high at temperatures close to normal temperature. Therefore, mention will be made about an epoxy coating material here.

There are some excellent epoxy adhesives and paints on the market and, even when they are produced in-house, the raw materials can be readily procured commercially. Specifically, bisphenol epoxy resins, glycidylamine epoxy resins, polyfunctional polyphenol epoxy resins, alicyclic epoxy resins and so forth are available for purchase and all of these materials can be used. It is also possible to use the product by reacting and linking of these epoxy resins with a polyfunctional third component, such as a polyfunctional oligomer having a plurality of hydroxyl groups. It is preferable to make an epoxy coating material by adding a polyfunctional amine compound to an epoxy resin and mixing.

The inventors incidentally conducted tests using commercially available epoxy paints as well and the product of diluting the resin adhesive EP106 (made by Cemedine) with a solvent was used as a home-made coating material for test purposes. This adhesive was a one-component thermosetting epoxy adhesive that already contained dicyandiamide as a curing agent and its viscosity at normal temperature was about 10 to 20 Pascal-seconds.

(B) MANNER OF JOINING

The steel and resin joining configuration will now be described in specific terms.

(a) Injection Joining

Figure 2:
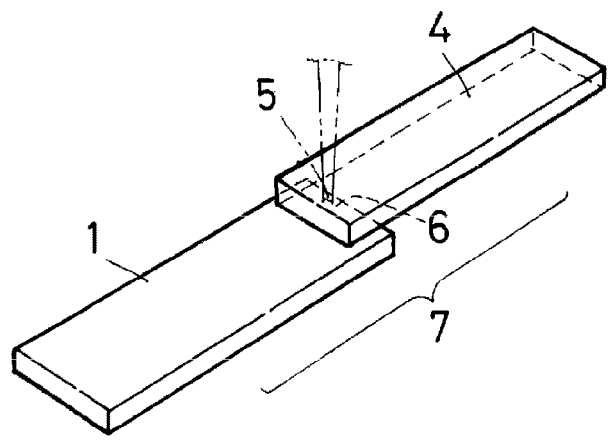
FIG. 2 is a schematic view of a composite of a metal and a resin manufactured by injection joining.

FIGS. 1 and 2 are related to the injection joining of a thermoplastic resin. FIG. 1 is a cross sectional view schematically illustrating a section of the metallic mold for injection molding used in the working examples. FIG. 1 shows a state in which the mold has been closed and injection molding is performed. FIG. 2 is a view of the appearance of a composite 7 of steel and resin molded in the metallic mold for injection molding. This mold is made up of a movable mold template 2 and a stationary mold template 3 and a resin injection component consisting of a pinpoint gate 5, a runner, etc., is provided on the stationary mold template 3 side.

The composite 7 is formed as follows. First, the movable mold template 2 is opened and a steel sheet 1 is inserted into a cavity formed between the movable mold template 2 and the stationary mold template 3. The movable mold template 2 is then closed, resulting in the pre-injection state shown in FIG. 1. Next, a molten resin composition is injected through the pinpoint gate 5 into the cavity in which the steel piece was inserted.

The injected resin composition 4 is joined with the steel sheet while filling the cavity to be molded, yielding the composite 7 in which metal and resin are integrated. The composite 7 has a joint face 6 between the steel sheet 1 and the resin composition 4 and the surface area of this joint face 6 is 5 mm×10 mm. Specifically, the surface area of the joint face 6 is 0.5 cm2.

(b) Joining by Pressure Welding

Figure 3:
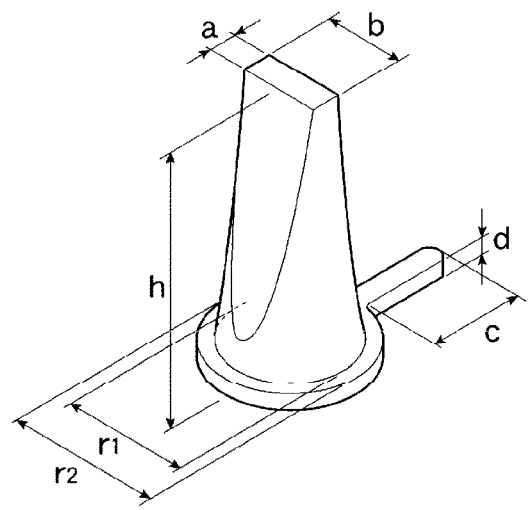
FIG. 3 is a view illustrating an example of the shape of a molded resin boss.
Figure 4:
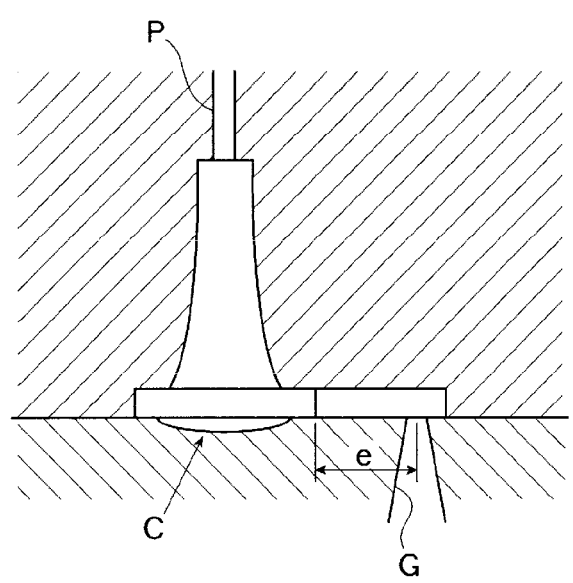
FIG. 4 is a schematic view showing how the bottom middle part of a boss bulges slightly outward on the mold when a resin boss is formed by injection molding.

FIGS. 3, 4, 5, 6, 7, and 8 are views related to the joining by pressure welding of a thermoplastic resin. FIG. 3 schematically illustrates the article produced by injection molding of the thermoplastic resin used in an experiment example. FIG. 4 shows that this molded resin is in a boss shape, which is designed so that the center of the bottom of the boss sticks out about 0.1 mm. In other words, when a filled boss-shaped article within any thinning is formed by injection molding, molding shrinkage of the resin composition always causes the center of the bottom part of the boss to sink in. A sunken bottom is undesirable for pressure welding, so the shape is pre-designed so that the center part of the bottom sticks out. The molding may be accomplished with a pin gate as in FIG. 4, while it is preferable that the bottom center of the boss bulges out about 0.1 mm or at the very least is flat in effect.

Figure 5:
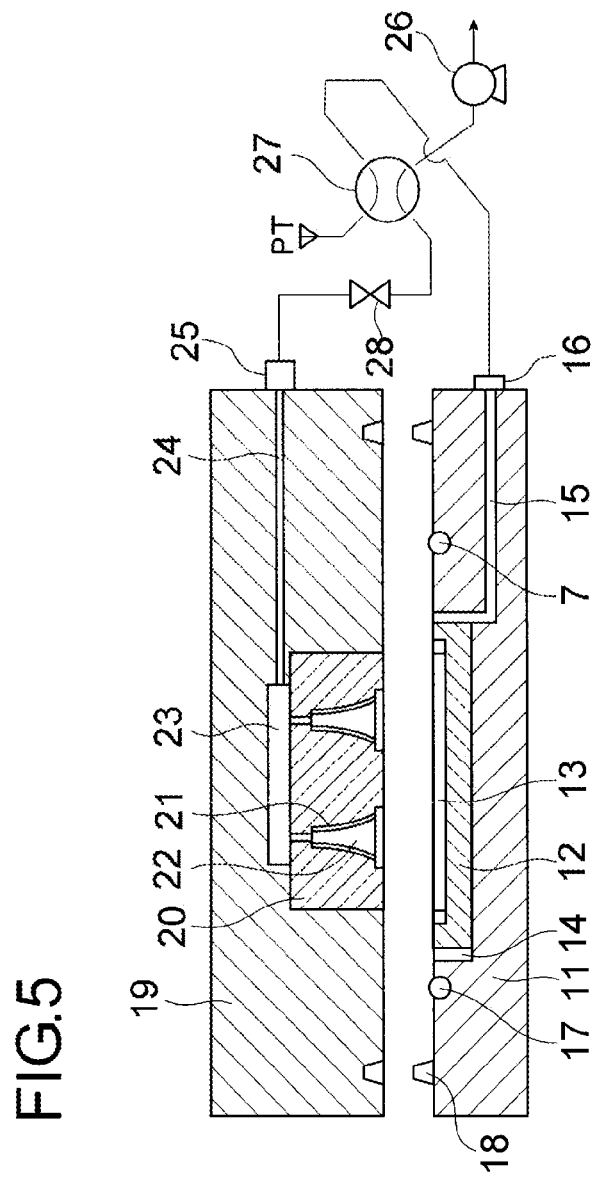
FIG. 5 is a schematic view of an example of the jig used for pressure welding of a metal alloy part and a resin part.

FIG. 5 is an example of the jig used to make an integrated product in which two bosses are welded to a steel sheet by pressure welding. A steel piece 13 that has been heated with a hot plate or the like is placed in a recess made in an adiabatic material 12 and an upper mold 19 is pressed against a lower mold 11 along with a molded resin 22 (with the runner portion cut off from the boss shown in FIG. 3) that had been placed on the upper mold 19 beforehand. At substantially the same time, a two-way cock 28 is opened, a line is connected to a pre-driven vacuum pump to reduce the entire system to a pressure of a few mmHg and then a few seconds later a four-way cock 27 is turned 90 degrees to return the entire system to normal pressure. This series of operations allows the molten resin in the bottom of the molded resin that melts in contact with the steel sheet to penetrate readily into the micron-order recesses on the steel material.

Figure 6:
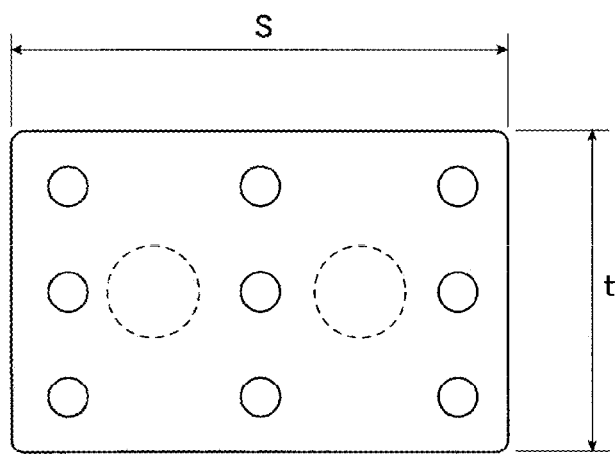
FIG. 6 is a plan view of a metal alloy piece used in the working examples of the present invention.
Figure 7:
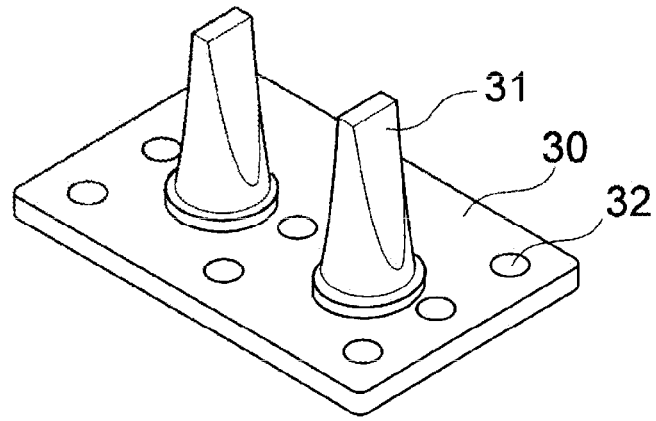
FIG. 7 is a view of an example of a part obtained with the present invention, in which a resin boss has been joined to a metal alloy sheet.
Figure 8A:
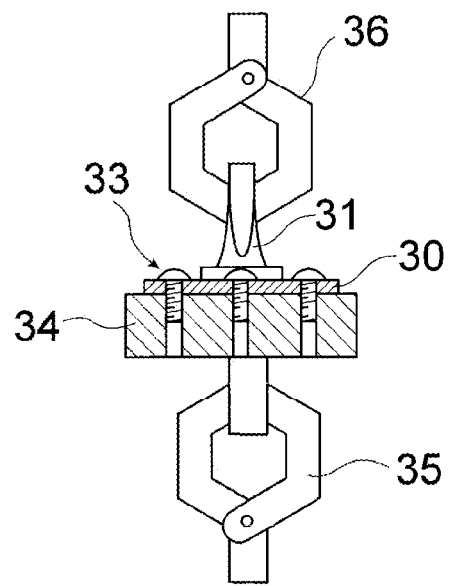
FIG. 8 is a schematic view showing the situation where the breaking strength is measured for a test piece comprising a metal alloy that has been integrated with a resin boss and produced in the working examples of the present invention.
Figure 8B:
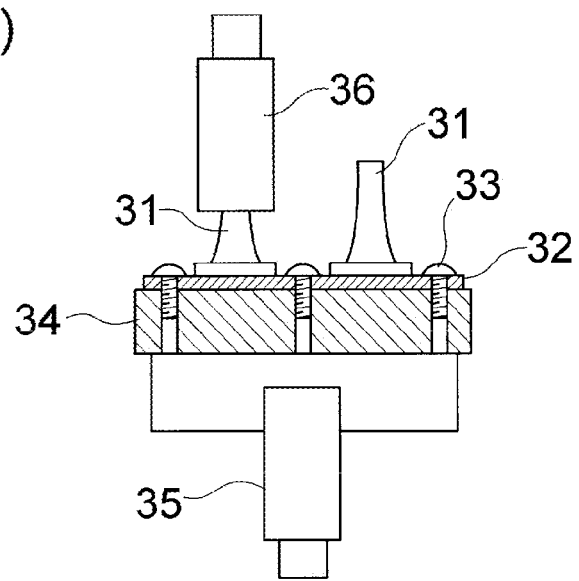

The resin is left to be cooled for a while and solidify, after which the upper mold 19 is lifted up and away from the lower mold 11 and the integrated product 30 adhering to the pressure welding jig is parted. The integrated product thus obtained is preferably annealed for about an hour if possible. While the annealing temperature varies with the melting point of the resin composition, it is preferably about 150° C. with PBT or a polyamide and about 170° C. with PPS or the like. Meanwhile, FIG. 6 shows the shape of a steel sheet used to make a composite with which the joint strength of pressure welding can be measured. The pressure welding test illustrated in FIG. 5 and discussed above is used here. Numerous screw holes are formed to be utilized in a tensile test. The integrated product 30 of steel and resin shown in FIG. 7 is obtained in the series of experiments.

(c) Adhesion Joining of Metals

Figure 11:
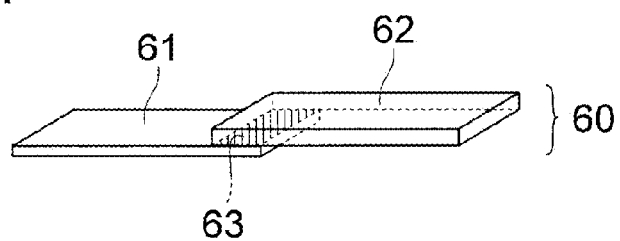
FIG. 11 is a schematic view illustrating an adhesion composite in which two metal pieces have been joined with a one-component thermosetting adhesive.
Figure 12:
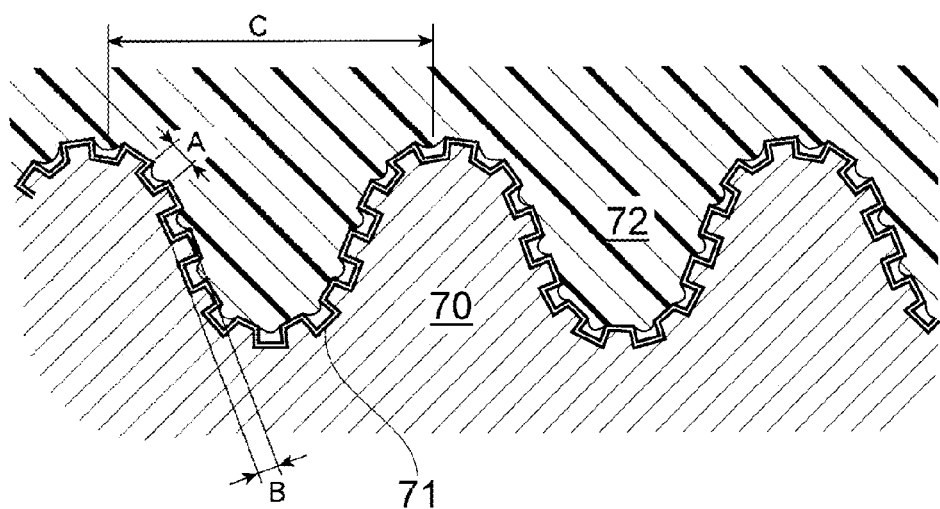
FIG. 12 is a schematic partial cross sectional view illustrating the metal alloy surface structure in the new NMT theory and the NAT theory.

FIG. 11 shows an example of the product by adhesion joining of metals including steel sheet according to the present invention. This is what was used in the working examples. The metal pieces measured 45 mm×18 mm and the bonding face measured 18 mm×approximately 3 mm, with a surface area being 0.5 to 0.6 cm2. This was used to measure the shear breaking strength at tensile break. Naturally, adhesion joining is also possible by changing one of the metal pieces from an aluminum-plated steel sheet to another kind of metal piece. Many kinds of metal pieces can be joined very tightly as long as they have undergone working for the same purpose as in the present invention, namely, aluminum alloys, magnesium alloys, copper alloys, titanium alloys, stainless steel, ordinary steel and so forth that have been treated according to the NAT theory.

(d) Joining of a Metal Piece and a FRP

Figure 9:
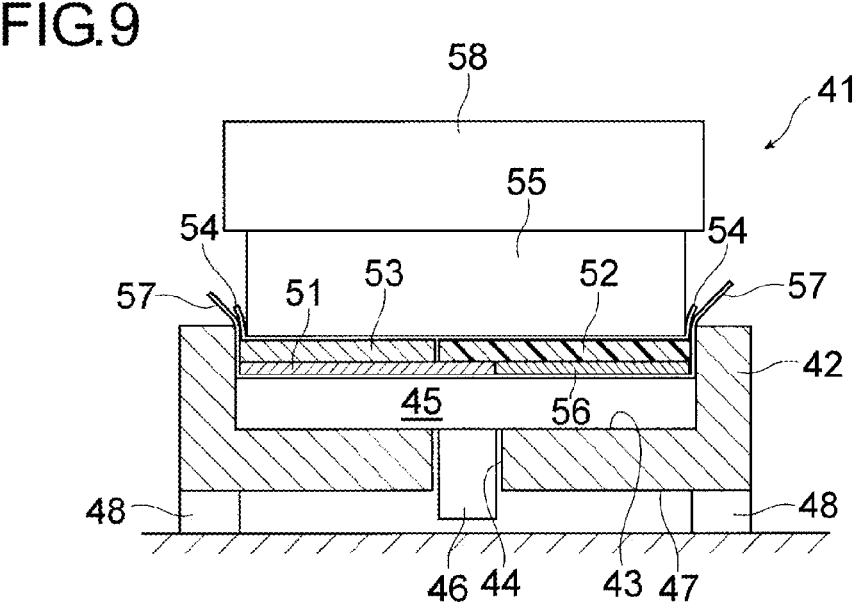
FIG. 9 is a cross sectional view schematically illustrating the firing jig used for sticking a metal piece and a pre-molded article together with a one-component thermosetting adhesive and curing the integrated in a hot air dryer.
Figure 10:
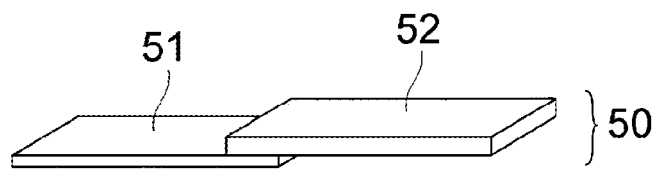
FIG. 10 is a schematic view illustrating an adhesion composite in which a metal piece and pre-molded article have been joined with a one-component thermosetting adhesive.

FIGS. 9 and 10 show the jig used to produce an integrated product for measuring the adhesion strength of CFRP and a steel sheet used by the inventors, as well as how this jig is used and the shape of the resulting integrated product. Reference numerals 42 in FIG. 9 is a combination mold made up of iron mold pieces. Reference numeral 57 is a parting film made up of two superposed sheets of polyethylene film cut into a rectangular shape for each. Reference numeral 51 is a steel sheet with a thickness of 1 mm, 53 and 56 are spacers made of polytetrafluoroethylene resin (hereinafter referred to as PTFE) and 52 is a carbon fiber weave and an epoxy adhesive that has been worked into the weave, that is, a CFRP prepreg.

Reference numeral 54 is a piece of parting polyethylene film and 55 is a block of PTFE. During heating and curing, the entire assembly as shown in FIG. 9 is placed inside a hot air dryer and a weight 58 of a few hundred grams is placed on top of the PTFE block 55. After the resin has been left to be cooled and cured, the weight 58, the block 55, the spacer 53, the film 54 and a pedestal 48 are removed, the mold 42 is pressed against the floor to separate the pedestal 45 from the mold 42 and an integrated product (FIG. 10) is taken out along with the parting film 57. The film may be peeled off as necessary.

(C) WORKING EXAMPLES

Working examples of the present invention will now be described in detail.

Observation and Measurement and Apparatus Used Therein

The composites of steel and resin obtained in these working examples were observed and measured, using the following apparatus.

(a) Measurement of PPS Melt Viscosity

The melt viscosity was measured using a Koka-type flow tester (CFT-500, made by Shimadzu Seisakusho, Kyoto, Japan) equipped with a die having a diameter of 1 mm and a length of 2 mm, at a measurement temperature of 315° C. and a load of 98 N (10 kgf).

(b) X-Ray Photoelectron Spectrometer (XPS Observation)

One surface observation method involved the use of a photoelectron spectrometer (XPS observation), which performs qualitative analysis of elements, etc., by analyzing the energy of photoelectrons emitted from a test piece when the test piece is irradiated with X-rays. This photoelectron spectrometer was an AXIS-Nova (trade name: made by Kratos Analytical, England) and Shimadzu Seisakusho, Kyoto, Japan), which is a model that allows surface with a diameter of only a few microns to be observed to a depth of a few nanometers.

(c) Electron Microscopy

An electron microscope was mainly used to observe the substrate surface. The electron microscopes used were a scanning electron microscope (SEM) S-4800 (trade name: made by Hitachi, Ltd., Tokyo, Japan) and a JSM-6700F (trade name: made by JEOL, Tokyo Japan) and observations were made at 1 to 2 KV.

(d) EDX Observation with Analytical Electron Microscope

An electron microscope equipped with an EDX function (analytical electron microscope) HF-3000S (trade name: made by Hitachi, Ltd., Tokyo, Japan) was used.

(e) Scanning Probe Microscope Observation

The above-mentioned microscope was mainly used to observe the substrate surface. This microscope was a scanning probe microscope having a probe with a pointed tip, which was traced over the surface of a substance to observe an enlarged image of the surface condition. The scanning probe microscope used here was an SPM-9600 (trade name: made by Shimadzu Seisakusho, Kyoto, Japan).

(f) Measurement of Joint Strength of Composite

The tensile strength was measured by stretching the composite 7 with a tensile tester to load the shear strength, and the shear force at break was termed the shear breaking strength. This tensile tester was a Model 1323 (trade name: made by Aikoh Engineering, Tokyo, Japan) and the shear force was measured at a stretching rate of 10 mm/minute.

Preparation Example 1

Preparation of PPS Composition 6214 g of Na2S.2.9H2O and 17,000 g of N-methyl-2-pyrrolidone were put into a 50 L autoclave equipped with a stirrer. The system was stirred under a nitrogen gas flow while the temperature was raised to 205° C., which was distilled off by 1355 g of water. The system was cooled to 140° C., after which 7160 g of p-dichlorobenzene and 5000 g of N-methyl-2-pyrrolidone were added and the system was sealed under a nitrogen gas flow.

The temperature of the system was raised to 225° C. over a period of 2 hours and was polymerized for 2 hours at 225° C., after which the temperature was raised to 250° C. over a period of 30 minutes and polymerization was performed for another 3 hours at 250° C. Upon completion of the polymerization, the system was cooled to room temperature and polymer was separated by centrifuge. The solids of the polymer were repeatedly washed with warm water and dried overnight at 100° C., which gave a PPS with a melt viscosity of 280 poise (hereinafter referred to as PPS (1)). This PPS (1) was cured for 3 hours at 250° C. under a nitrogen atmosphere to obtain another PPS (hereinafter referred to as PPS (2)). The melt viscosity of the PPS (2) thus obtained was 400 poise.

6.0 kg of the PPS (2) obtained above, 1.5 kg of an ethylene/acrylic acid ester/maleic anhydride ternary copolymer Bondine=8030 (made by Arkema, France) and 0.5 kg of an epoxy resin Epikote 1004 (made by Japan Epoxy Resin, Tokyo, Japan) were uniformly mixed beforehand in a tumbler. After this, glass fiber RES03-TP91 (made by Nippon Sheet Glass, Tokyo, Japan) with an average fiber diameter of 9 μm and a fiber length of 3 mm was supplied from a side feeder, so that the added amount would be 20 wt %, with a biaxial extruder TEM-35B (made by Toshiba Machine, Numazu-city, Shizuoka, Japan), while melt kneading was performed at a cylinder temperature of 300° C., which gave pellets of a PPS composition (1). The PPS composition (1) thus obtained was dried for 5 hours at 175° C.

Preparation Example 2

Preparation of PPS Composition

The PPS (1) obtained in Preparation Example 1 was cured for 3 hours at 250° C. under an oxygen atmosphere to obtain a PPS (hereinafter referred to as PPS (3)). The PPS (3) thus obtained had a melt viscosity of 1800 poise.

5.98 kg of the PPS (3) obtained above and 0.02 kg of polyethylene Nipolon Hard 8300A (made by Tosoh, Tokyo, Japan) were uniformly mixed beforehand in a tumbler. After this, glass fiber RES03-TP91 with an average fiber diameter of 9 μm and a fiber length of 3 mm was supplied from a side feeder, so that the added amount would be 40 wt %, with a biaxial extruder (TEM-35B), while melt kneading was performed at a cylinder temperature of 300° C., which gave pellets of a PPS composition (2). The PPS composition (2) thus obtained was dried for 5 hours at 175° C.

Preparation Example 3

Preparation of PPS Composition 7.2 kg of the PPS (2) obtained in Preparation Example 1 and 0.8 kg of a glycidyl methacrylate/ethylene copolymer Bondfast E (made by Sumitomo Chemical, Tokyo, Japan) were uniformly mixed beforehand in a tumbler. After this, glass fiber RES03-TP91 with an average fiber diameter of 9 μm and a fiber length of 3 mm was supplied from a side feeder, so that the added amount would be 20 wt %, with a biaxial extruder (TEM-35B), while melt kneading was performed at a cylinder temperature of 300° C., which gave pellets of a PPS composition (3). The PPS composition (3) thus obtained was dried for 5 hours at 175° C.

Preparation Example 4

Preparation of PPS Composition 4.0 kg of the PPS (2) obtained in Preparation Example 1 and 4.0 kg of an ethylene/acrylic acid ester/maleic anhydride ternary copolymer Bondine TX8030 (made by Arkema, France) were uniformly mixed beforehand in a tumbler. After this, glass fiber RES03-TP91 with an average fiber diameter of 9 μm and a fiber length of 3 mm was supplied from a side feeder, so that the added amount would be 20 wt %, with a biaxial extruder (TEM-35B), while melt kneading was performed at a cylinder temperature of 300° C., which gave pellets of a PPS composition (4). The PPS composition (4) thus obtained was dried for 5 hours at 175° C.

Preparation Example 5

Preparation of PBT Composition 4.5 kg of a PBT resin Toraycon 11005 (made by Toray, Tokyo, Japan) and 0.5 kg of a PET resin TR-4550BH (made by Teijin Kasei, Tokyo, Japan) were uniformly mixed in a tumbler. After this, glass fiber RES03-TP91 with an average fiber diameter of 9 μm and a fiber length of 3 mm was supplied from a side feeder, so that the added amount would be 30 wt %, with a biaxial extruder (TEM-35B), while melt kneading was performed at a cylinder temperature of 270° C., which gave pellets of a PBT resin composition. This was dried for 3 hours at 140° C. to obtain a PBT composition (1).

Preparation Example 6

Preparation of PBT Composition 6.0 kg of PBT resin (Toraycon 1401X31, made by Toray, Tokyo, Japan), 0.7 kg of an ethylene/acrylic acid ester/maleic anhydride ternary copolymer Bondine=8030 (made by Arkema, France) and 0.15 kg of an epoxy resin Epikote 1004 (made by Japan Epoxy Resin, Tokyo, Japan) were uniformly mixed beforehand in a tumbler. After this, glass fiber RES03-TP91 (made by Nippon Sheet Glass, Tokyo, Japan) with an average fiber diameter of 9 μm and a fiber length of 3 mm was supplied from a side feeder, so that the added amount would be 30 wt %, with a biaxial extruder TEM-35B (made by Toshiba Machine, Numazu-shi, Shizuoka, Japan), while melt kneading was performed at a cylinder temperature of 270° C., which gave pellets of a PBT composition (2). The PBT composition (2) thus obtained was dried for 5 hours at 150° C.

Preparation Example 7

Preparation of PBT Composition 6.0 kg of a PBT resin Toraycon 1401X31 (made by Toray, Tokyo, Japan), 0.5 kg of a PET resin TR-4550BH (made by Teijin Kasei, Tokyo, Japan), 0.5 kg of an ethylene/acrylic acid ester/maleic anhydride ternary copolymer Bondine=8030 (made by Arkema, France) and 0.1 kg of an epoxy resin Epikote 1004 (made by Japan Epoxy Resin, Tokyo, Japan) were uniformly mixed beforehand in a tumbler. After this, glass fiber RES03-TP91 (made by Nippon Sheet Glass, Tokyo, Japan) with an average fiber diameter of 9 μm and a fiber length of 3 mm was supplied from a side feeder, so that the added amount would be 30 wt %, with a biaxial extruder TEM-35B (made by Toshiba Machine, Numazu-shi, Shizuoka, Japan), while melt kneading was performed at a cylinder temperature of 270° C., which gave pellets of a PBT composition (3). The PBT composition (3) thus obtained was dried for 5 hours at 150° C.

Experiment Example 1

Production of Aluminum-Plated Steel Sheet

An aluminum-plated steel sheet having a thickness of 0.6 mm and having undergone a chromate treatment MSA120 (made by Nissin Steel, Tokyo, Japan) was cut into rectangular pieces measuring 18 mm×45 mm to obtain steel pieces termed the metal sheets 1. An aqueous solution containing aluminum degreaser NE-6 (made by Meltex, Tokyo, Japan) by 7.5% was readied at 65° C. in a tank and this aqueous solution was used as a degreasing aqueous solution. A hydrochloric acid aqueous solution with a concentration of 1% was readied at 40° C. in another tank and was used as an aqueous solution for preliminary acid washing. An aqueous solution containing caustic soda by 1.5% was readied at 40° C. in yet another tank and was used as an etching solution. A nitric acid aqueous solution with a concentration of 3% was readied at 40° C. for neutralization use in still another tank. A hydrazine monohydrate aqueous solution with a concentration of 3.5% was readied at 60° C. for fine etching in still another tank.

The steel sheets were first immersed for 5 minutes in the degreaser tank and rinsed with water. Then they were immersed for 1 minute in the preliminary acid washing tank and rinsed with water. Then they were immersed for 0.75 minute in the etching tank and rinsed with water. Then they were immersed for 1 minute in the neutralization tank and rinsed with water. Then they were immersed for 1 minute in the fine etching tank and rinsed with water. Deionized water was used for all of the rinsing. This product was dried for 15 minutes at 67° C. to obtain treated steel pieces.

Two days later, one of the pieces was observed by electron microscope and scanning probe microscope. FIGS. 13 and 14 are electron micrographs in magnification of 10,000 times and 100,000 times, respectively. It can be seen in the former that pebble-like protrusions with a diameter of at least about 0.3 μm and three-dimensional protrusions with complex shapes, in which the minor diameter is at least 0.3 and the major diameter is at least a few microns, are scattered over the plain. The latter is a micrograph of this plain and it can be seen that the portion covered by adjacent, shallow recesses with a diameter of 20 to 50 nm accounts for approximately 30% of the plain. Also, measurements were made at five places (20 in different directions with a scanning probe microscope and, as a result, the surface was found to be rough, with its mean roughness period (mean length of profile element) RSm being 4 to 7 μm and its maximum height roughness Rz being 1 to 3 μm.

Experiment Example 2

Injection Joining

The aluminum-plated steel sheets produced in Experiment Example 1 were taken out, the portion with the hole formed was grasped with a glove so that no oil or the like would adhere and each piece was inserted into a metallic mold for injection molding. The mold was closed and the PPS composition (1) obtained in Preparation Example 1 was injected at an injection temperature of 310° C. The mold temperature was 140° C. and 20 integrated composites shown in FIG. 2 were obtained. The size of the resin part was 10 mm×45 mm×5 mm and the joining face 6 measured 10 mm×5 mm (0.5 cm2). These products were placed for 1 hour in a hot air dryer set at 170° C. on the day of molding to anneal them and then one day later they were subjected to a tensile test, which revealed the average shear breaking strength for five composites to be 23.5 MPa.

Experiment Example 3

Comparative Example of Injection Joining

Other than using the PPS composition (2) obtained in Preparation Example 2 instead of the PPS composition (1) obtained in Preparation Example 1, steel sheets were produced by the method in Experiment Example 1 and composites obtained by injection joining in exactly the same manner as in Experiment Example 2. The composites thus obtained were annealed for 1 hour at 170° C. In other words, this experiment made use of a PPS resin composition that consists of PPS, in which polyolefin polymer was contained only by a tiny amount, and filler alone. One day later, five of these composites were subjected to a tensile test, which revealed the average shear breaking strength for five composites to be 9.2 MPa. This was far from Working Example 1 and the difference in the used resin materials showed up in the result.

Experiment Example 4

Injection Joining

Other than using the PPS composition (3) obtained in Preparation Example 3 instead of the PPS composition (1) obtained in Preparation Example 1, composites were obtained by exactly the same method as in Experiment Example 2, using steel sheets produced according to Experiment Example 1. The composites were annealed for 1 hour at 170° C. on the day of molding and two days later these composites were measured for shear breaking strength with a tensile tester. The average for five composites was 21.1 MPa.

Experiment Example 5

Comparative Example of Injection Joining

Other than using the PPS composition (4) obtained in Preparation Example 4 instead of the PPS composition (1) obtained in Preparation Example 1, composites were obtained by exactly the same method as in Experiment Example 2, using steel sheets produced according to Experiment Example 1. In other words, this experiment made use of a PPS resin composition that contained an extremely large amount of polyolefin polymer. However, a large quantity of gas was generated during molding and molding had to be ceased. In this experiment, PPS was not the main component of the resin composition.

Experiment Example 6

Injection Joining

The PBT composition 1 obtained in Preparation Example 5, and the steel sheets produced in Experiment Example 1 were used. Specifically, a steel sheet was inserted into a metallic mold for injection molding. The mold was closed and the PBT composition (1) obtained in Preparation Example 5 was injected at an injection temperature of 280° C. The mold temperature was 140° C. and five integrated composites shown in FIG. 2 were obtained. The resin part measured 10 mm×45 mm×5 mm and the joining face 6 measured 10 mm×5 mm (0.5 cm2). These products were placed for 1 hour in a hot air dryer set at 170° C. on the day of molding to anneal them and then one day later they were subjected to a tensile test, which revealed the average shear breaking strength for five composites to be 23.6 MPa.

Experiment Example 7

Comparative Example of Injection Joining

Other than using a commercially available PBT resin containing glass fiber Toraycon 1101-G30 (made by Toray, Tokyo, Japan) by 30% instead of the PBT composition (1) obtained in Preparation Example 5, composites were obtained by injection joining by exactly the same method as in Experiment Example 5. The composites thus obtained were annealed for 1 hour at 150° C. In other words, this experiment made use of a PBT resin composition that contained PBT, which did not contain any polymer that would boost injection joining, and filler alone. One day later, five of these composites were subjected to a tensile test, which revealed the average shear breaking strength for five composites to be 9.0 MPa. This was far from Experiment Example 6 and the difference in the resin material used showed up in the result.

Experiment Example 8

Injection Joining

Other than using the PBT composition (2) obtained in Preparation Example 6 instead of the PBT composition (1) obtained in Preparation Example 5, composites were obtained by exactly the same method as in Experiment Example 5, using steel sheets produced according to Experiment Example 1. The composites were annealed for 1 hour at 150° C. on the day of molding and two days later these composites were measured for shear breaking strength with a tensile tester. The average for five composites was 21.7 MPa.

Experiment Example 9

Injection Joining

Other than using the PBT composition (3) obtained in Preparation Example 7 instead of the PBT composition (1)

obtained in Preparation Example 5, composites were obtained by exactly the same method as in Experiment Example 6, using steel sheets produced according to Experiment Example 1. The composites were annealed for 1 hour at 150° C. on the day of molding and two days later these composites were measured for shear breaking strength with a tensile tester. The average for five composites was 19.8 MPa.

Experiment Example 10

Production of Injection

Molded Article

Articles by injection molding with the shape shown in FIGS. 3 and 4 were produced using (a) a PBT resin containing glass fiber Toraycon 1101-G30 (made by Toray, Tokyo, Japan) by 30%, (b) the PBT composition 3 obtained in Preparation Example 7, (c) a PPS resin containing glass fiber Susteel GS40 (made by Tosoh, Tokyo, Japan) by 30%, (d) the PPS composition (1) obtained in Preparation Example 1, (e) a nylon-6 resin containing glass fiber B3EG7 (made by BASF, Germany) by 30%, (f) an aromatic polyamide resin containing glass fiber Amilan CM3510G50 (made by Toray, Tokyo, Japan) by 50% and (g) a liquid crystal polymer Vectra A460 (made by Polyplastics, Tokyo, Japan). The runners of the molded articles thus obtained (the portions that protrude from the gate and are linked to the main body) were cut off at the base with nippers and the products were used in the following experiment.

Experiment Example 11

Pressure Welding Experiment

The article by injection molding 22 produced in Experiment Example 10 was fitted into an adiabatic material portion 20 of the upper mold 19 of the jig system shown in FIG. 5. Meanwhile, the aluminum-plated steel sheet obtained in Experiment Example 1 was heated on a hot plate, picked up with pliers and set in the recess of the adiabatic material 12 of the lower mold 11 shown in FIG. 5. A vacuum pump was driven, the upper and lower molds were pressed together right away, and the cock 28 was opened. After waiting for a few seconds to 5 seconds, the inside pressure became about a few mmHg and since the bottom of the molded resin 22 melted, the four-way cock 27 was turned 90 degrees to return the inside of the system to normal pressure.

Although it depends on the size (thermal capacity) of the metal pieces and the temperature at heating, it is the technological key to adjust so that the bottom part of the molded resin may be kept in a molten state for about 10 seconds or more. In this series of operations, the molten resin works its way into the micron-order recesses in the steel sheet surface and, when it then crystallizes and solidifies, this results in a strong joint. The integrated resin-metal composite shown in FIG. 7 is finally obtained, so this is annealed by being left for 1 hour in a hot air dryer at the temperature of 150° C. and then is allowed to be cooled. One week later, the joint strength was measured by performing a tensile breaking test in which the molded resin was caused to be separated from the steel sheet with the apparatus shown in FIG. 8. These results are shown in Table 1. Samples that broke at 50 kgf or less were rated "fail", while those that did not break were rated "pass".

Experiment Example 12

Comparative Example of Pressure Welding Experiment

The aluminum-plated steel sheets with a thickness of 0.6 mm shown in FIG. 6 were used, where, unlike in Experiment Example 1, a pressure welding test was conducted on the same various molded resins as in Experiment Example 10 by using the sheets that had undergone only degreasing. These results are given in Table 1 as "comparative sample." Obviously, there was no adhesion whatsoever.

TABLE 1

Results of pressure welding test on aluminum-plated steel sheet

| Type of resin | Temperature at Heating | Joining | Comparative sample |
|---|---|---|---|
| (1) PBT "Toraycon 1101-G30" | 300° C. | Pass | fail |
| (2) PBT/PET/polyolefin | 300° C. | Pass | fail |
| (3) PPS "Susteel GS40" | 330° C. | Pass | fail |
| (4) PPS/polyolefin | 330° C. | Pass | fail |
| (5) PA6 "B3EG7" | 300° C. | Pass | fail |
| (6) Aromatic Polyamide "Amilan CM3501G50" | 300° C. | Pass | fail |
| (7) Liquid crystal polymer "Vectra A460" | 300° C. | Pass | fail |

Experiment Example 13

Bonding

The end of each of steel sheet pieces produced in Experiment Example 1 was coated with an epoxy adhesive EP106 (made by Cemidine, Tokyo, Japan) and the pieces were put in a desiccator. The pressure was reduced with a vacuum pump until the internal pressure was 5 mmHg. The pieces were left in this reduced pressure state for 2 minutes and then returned to normal pressure. This operation of pressure reduction and return to normal pressure was repeated a total of three times, after which the steel sheets were taken out of the desiccator. Two of the steel sheets that had been coated with an adhesive were bonded together and fixed with clips in the configuration shown in FIG. 11. The bonded surface area was 0.6 to 0.7 cm2. This fixed test piece was put in a hot air dryer and heated. Specifically, the temperature was raised to 135° C. and held for 40 minutes, after which it was further raised to 165° C. and this temperature was held for 30 minutes. The test piece was allowed to be cooled and one week later its shear breaking strength was measured by tensile breakage and found to be 450 kgf/cm2 (44 MPa), which is extremely strong.

Experiment Example 14

Production of CFRP Prepreg

A thermosetting resin composed of the components in Table 2 was made to produce a prepreg.

TABLE 2

Recipe for CFRP-use epoxy resin

| | |
|---|---|
| Brominated bisphenol A type solid epoxy resin "EPC-152" (made by Dainippon Ink & Chemicals) | 10.0 weight parts |
| Bisphenol A type liquid epoxy resin "EP-828" (made by Japan Epoxy Resin) | 13.9 weight parts |

TABLE 2-continued

| Recipe for CFRP-use epoxy resin | |
| --- | --- |
| Tetraglycidyldiaminophenylmethane "ELM-434" (made by Sumitomo Chemical) | 15.0 weight parts |
| Bisphenol F type liquid, epoxy resin "EPC-830" (made by Dainippon Ink & Chemicals) | 24.8 weight parts |
| 4,4'-diaminodiphenylsulfone 4,4'-DDS (made by Wakayama Seika) | 25.0 weight parts |
| $BF_3$ monoethylamine complex "$BF_3$-MEA" | 0.3 weight part |
| Weakly crosslinkable carboxyl group terminated solid acrylonitrile-butadiene rubber 611 (made by Nihon Zeon) | 8.0 weight parts |
| Thermoplastic resin, hydroxyl group terminated polyether sulfone "PES-100P" (made by Mitsui Toatsu Chemical) | 3.0 weight parts |
| Total | 100.0 weight parts |

The thermosetting resin composed of the components in Table 2 was mixed at normal temperature and shaped into a sheet-like form with a roll. The thermosetting resin films thus obtained were placed in a prepreg machine and compacted under pressure by a standard method from both sides of carbon fibers T-300 (made by Toray, Tokyo, Japan) used as reinforcing fiber and aligned in one direction, which gave a prepreg adjusted to a resin content of 38%. The fiber basis weight was 190 g/m2.

Experiment Example 15

Production of Composite

An aluminum-plated steel sheet having a thickness of 0.6 mm was cut into rectangular pieces measuring 45 mm×15 mm. The product of the exact same liquid treatment as in Experiment Example 13 was coated with an epoxy adhesive and put in a desiccator, then operation of pressure reduction and return to normal pressure was performed three times. Meanwhile, the method for using the baking mold 40 shown in FIG. 9 was as discussed previously. The mold 41 was lined with a 0.05 mm polyethylene parting film 57 and the above-mentioned steel sheet 51 and PTFE spacer 56 were put in place. Layers of straight woven cloth made from separately cut carbon fiber T-300 (made by Toray, Tokyo, Japan) was laid down, three sheets were stacked while coating them with an epoxy resin EP-106 from an injector and then a polyethylene parting film 54 was laid over the top of the steel sheet 51. Approximately 1 cc of the liquid one-component dicyandiamide curing type of epoxy adhesive EP-106 was used.

The PTFE spacer 53 and block 55 were put in place, and the whole assembled was put in a hot air dryer. An iron weight 58 of 0.5 kg was then placed on the PTFE spacer 53 and block 55, power was switched on to the dryer and the temperature was raised to 135° C. Heating was performed for 40 minutes at 135° C., then the temperature was raised to 165° C. over a period of 5 minutes, the temperature was held at 165° C. for 60 minutes, then the power was shut off to allow the contained to be cooled with the door still shut. On the following day the molded article was taken out of the dryer and parted from the baking mold 1 and the polyethylene film was peeled off to obtain the composite 50 shown in FIG. 10. The same operation was repeated to obtain 8 integrated composites 50 of CFRP and steel sheet.

On the second day after joining, three test pieces were subjected to a tensile breaking test. The CFRP portion was sandwiched between two SUS304 stainless steel pieces, which had a thickness of 1 mm and had been sanded with sandpaper, and this assembly was sandwiched between chucking plates and fixed. Four of these assemblies were tested and the average shear breaking strength was 32 MPa, which is strong. Here, the joining surface area was calculated as the surface area of the overlapping portions in FIG. 2.

Experiment Example 16

Production of Composite

An aluminum-plated steel sheet having a thickness of 0.6 mm was cut into rectangular pieces measuring 45 mm×15 mm. The product obtained by quite the same liquid treatment as in Experiment Example 13 was coated with an epoxy adhesive and put in a desiccator, then an operation of pressure reduction and return to normal pressure was performed three times. Meanwhile, the method for using the baking mold 40 shown in FIG. 9 was as discussed previously. The mold 41 was lined with a 0.05 mm polyethylene parting film 57, and the above-mentioned brass alloy 51 and PTFE spacer 56 were put in place. Three sheets of the prepreg produced in Experiment Example 14 that had been separately cut were stacked and then a polyethylene parting film 54 was laid over the top of the steel sheet 51.

The PTFE spacer 53 and block 55 were put in place and the whole assembled was put in a hot air dryer. An iron weight 58 of 0.5 kg was then placed over the PTFE spacer 53 and block 55, power was switched on to the dryer and the temperature was raised to 135° C. The material was heated for 1 hour at 120° C., then the temperature was raised to 165° C. over a period of 10 minutes, the temperature was held at 165° C. for 2 hours, then the power was shut off to allow the contained to be cooled with the door still shut. On the following day the molded article was taken out of the dryer and parted from the baking mold 1 and the polyethylene film was peeled off to obtain the composite 50 shown in FIG. 10. The same operation was repeated to obtain 8 integrated composites 50 of CFRP and steel sheet.

On the second day after joining, three test pieces were subjected to a tensile breaking test. The CFRP portion was sandwiched between two SUS304 stainless steel pieces, which had a 1 mm thickness and had been sanded with sandpaper, and this assembly was sandwiched between chucking plates and fixed. Four of these assemblies were tested and the average shear breaking strength was 36 MPa, which is strong. Here, the joining surface area was calculated as 1×m in FIG. 2.

Experiment Example 17

Bonding

An adhesive was obtained by thoroughly mixing 10 g of a commercially available GFRP-use vinyl ester type of unsaturated polyester Repoxy R802 (made by Showa High Polymer, Tokyo, Japan) and 0.1 g of t-butyl peroxybenzoate Perbutyl Z (made by NOF, Tokyo, Japan). The end of each of the steel sheets produced in Experiment Example 1 was coated with this adhesive and the test pieces were put into a desiccator. The pressure was reduced with a vacuum pump until the internal pressure was no more than 50 mmHg. The pieces were left in this reduced pressure state for a few seconds and then returned to normal pressure. This operation of pressure reduction and return to normal pressure was repeated a total of three times, after which the steel sheets were taken out of the desiccator.

Two of the steel sheets that had been coated with an adhesive were bonded together and fixed with clips in the configuration shown in FIG. 11. Three sets of this fixed test piece were produced. The bonded surface area was 0.6 to 0.7 cm2. The fixed test pieces were put in a hot air dryer and heated. Specifically, the temperature was raised to 90° C. and held for 1 hour, after which it was further raised to 120° C. and held for 1 hour. The test piece was allowed to be cooled and one week later its shear breaking strength was measured by tensile breakage and found to be 300 kgf/cm2 (30 MPa), which is extremely strong.

Experiment Example 18

Painting 10 g of a one-component thermosetting adhesive EP106 (made by Cemidine, Tokyo, Japan) and 10 g of methyl ethyl ketone were mixed and completely dissolved to obtain an epoxy coating material. Five of the above-mentioned steel sheets were placed on cardboard and coated with the above-mentioned home-made coating material using a brush. After air drying for a while, the sheets were placed along with the cardboard in a 135° C. hot air dryer and left for 30 minutes, then the temperature was raised to 150° C. and left for 20 minutes at this temperature, after which the sheets were taken out of the hot air dryer after. The steel sheets were then flipped over on the cardboard and the face on the other side was also coated with the home-made coating material using a brush. After air drying for a while, the sheets were placed along with the cardboard in a 135° C. hot air dryer and left for 30 minutes, then the temperature was raised to 165° C. and left for 30 minutes at this temperature, after which the sheets were taken out of the hot air dryer. The side that was coated and baked last was used as the front side.

Experiment Example 19

Comparative Example of Painting

Five aluminum-plated steel sheets MSA120 (made by Nissin Steel, Tokyo, Japan), each of which had been cut to 25 mm×100 mm and had a hole of 3 mm in diameter formed at one end, were readied. These were immersed in just the degreasing tank used in Experiment Example 1 and then rinsed with water and dried for 15 minutes at 67° C. Then, the same home-made epoxy coating material as in Experiment Example 18 was used to paint the front and back sides. The front and back were determined in the same manner as in Experiment Example 18.

Experiment Example 20

Corrosion Resistance Test

The corrosion resistance at one end was measured using the painted aluminum-plated steel sheets produced in Experiment Examples 18 and 19. Specifically, five painted steel sheets used in each experiment example were taken and a box cutter was used to make one longitudinal scratch and one lateral scratch, which went down to the steel, on the front side of each steel sheet. In other words, the sheets were cross-cut. Meanwhile, a plastic bucket was filled with 5 L of brine (concentration of 5%) made from deionized water, a copper wire was passed through a hole in the end of each steel sheet and the steel pieces were hung inside the bucket so that the whole pieces did not overlap. Here, the pieces were completely submerged in the water. The bucket was lightly covered with a polyethylene bag, placed in a warm air dryer and left for 10 days at 67° C. The plastic bag was removed every day except Saturday and Sunday and the small amount of evaporated water was replenished. The test pieces were taken out of the bucket and immersed in pure water for 15 minutes, rinsed simply and then put in a 67° C. warm air dryer and dried for 30 minutes.

The test piece was checked to see how much paint swelling by width there was from the score line made with the box cutter on the front side and to see what happened at the intersection of the lines. After this, the white rust was scraped off with a fingernail and the size of the rust base and its spread were observed. These results are given in Table 3 and it can be seen that the adhesive strength of the coating film is slightly superior with the present invention.

TABLE 3

Results of Heating Resistance and Saltwater Permeation Test

| Aluminum-plated steel sheet used | Lines | Intersection |
|---|---|---|
| Present invention (Experiment Example 18) | White rust on all five, but base did not spread laterally. | Base of white rust spread maximum of 0.5 mm from corner of intersection. |
| Comparative sample (Experiment Example 19) | Two same as above, but three each had traces of white rust at one place. | Base spread 0.5 to 0.8 mm from corner of intersection in all five. |

The present invention can be applied in a variety of fields to improve joinability, increase efficiency, expand the range of application and so forth and makes possible new design methods in the manufacture of building materials and outdoor home devices. Specifically, an aluminum-plated steel sheet with a relatively simple shape and a molded resin with a complex shape can be manufactured by an automatic and efficient method (injection joining, pressure welding) without the use of an adhesive. Also, an aluminum-plated steel sheet and a FRP can be integrated via an unsaturated polyester adhesive, which should be useful in merchandise intended for outdoor use, specifically, in the manufacture of structural materials, building materials and parts for home equipment and devices. Furthermore, the long-term corrosion resistance of an aluminum-plated steel sheet can be further increased by coating with an epoxy coating material, so the present invention is useful in improving the performance of precoated steel sheets.

By providing a special fine texturing configuration to the surface of an inexpensive steel sheet material, the joining of crystalline thermoplastic resins, various kinds of adhesive, paints and other such coating materials becomes complete and as a result, a strong bond can be obtained even when a CFRP, GFRP or other such FRP are used as the adherend of the adhesive joining. The present invention is a quite basic technology invention, with so many applications that they cannot be listed here, and can contribute to improving the performance of various kinds of parts and to the manufacturing productivity of the same in many fields besides those discussed above.

What is claimed is:
1. A method for manufacturing a composite of steel and resin, comprising:
   a shaping step of shaping an aluminum-plated steel sheet by mechanical working;
   a step of chemically etching the shaped steel material with an acidic or basic aqueous solution;

a step of finely etching the treated steel material with a weakly basic aqueous solution having a pH of 9 to 11;

a step of separately obtaining a molded resin from a polybutylene terephthalate resin a polyphenylene sulfide resin, a polyamide resin, or a resin composition whose main component is a liquid crystal polymer by a resin molding method represented by injection molding;

a heating step of heating the steel material that has gone through the chemical reaction steps to a temperature of at least the melting temperature of the resin composition; and a joining step of pressing the molded resin against the heated steel material thereby to performing pressure welding of the two, wherein said step of chemically etching the shaped steel material and said step of finely etching the treated steel material are performed so as to form, on said aluminum-plated steel material, a surface configuration in which three-dimensional protrusions having a minor diameter of at least 0.3 um and a major diameter of at least 3 um are scattered over a plain part so that, as to surface roughness profile, mean length of profile element RSm is in a range of 3 to 20 μm and maximum height of roughness profile Rz is in a range of 1 to 8 μm and a portion covered with shallow fine recesses with a diameter of 20 to 50 nm in a state of being distributed adjacent to each other on the plain part accounts for 30 to 50% of the surface area of the plain part, and in which the surface of the three-dimensional protrusions is mainly a ceramic containing silicon and the plain part is mainly a ceramic containing aluminum, the surface configuration of the aluminum-plated steel material being obtained by subjecting the aluminum-plated steel material to a specific chemical reaction treatment.

2. A method for manufacturing a composite of steel and resin, comprising:

a shaping step of shaping an aluminum-plated steel sheet by mechanical working;

a step of chemically etching the shaped steel material with an acidic or basic aqueous solution;

a step of finely etching the treated steel material with a weakly basic aqueous solution having a pH of 9 to 11;

an insertion step of inserting the steel material that has undergone the chemical reaction steps into a metallic mold for injection molding; and an injection joining step of integrating the steel material with the resin composition by injecting a first resin composition, in which a polybutylene terephthalate resin is a main component and a polyethylene terephthalate resin and/or a polyolefin resin is a minor component, a second resin composition, in which a polyphenylene sulfide resin is a main component and a polyolefin resin is a minor component, or a third resin composition, in which an aromatic polyamide resin is a main component and an aliphatic polyamide resin is a minor component, onto the inserted steel material, wherein said step of chemically etching the shaped steel material and said step of finely etching the treated steel material are performed so as to form, on said aluminum-plated steel material, a surface configuration in which three-dimensional protrusions having a minor diameter of at least 0.3 um and a major diameter of at least 3 um are scattered over a plain part so that, as to surface roughness profile, mean length of profile element RSm is in a range of 3 to 20 μm and maximum height of roughness profile Rz is in a range of 1 to 8 μm and a portion covered with shallow fine recesses with a diameter of 20 to 50 nm in a state of being distributed adjacent to each other on the plain part accounts for 30 to 50% of the surface area of the plain part, and in which the surface of the three-dimensional protrusions is mainly a ceramic containing silicon and the plain part is mainly a ceramic containing aluminum, the surface configuration of the aluminum-plated steel material being obtained by subjecting the aluminum-plated steel material to a specific chemical reaction treatment.

3. A method for manufacturing a composite of steel and resin, comprising:

a shaping step of shaping an aluminum-plated steel sheet by mechanical working;

a step of chemically etching the shaped steel material with an acidic or basic aqueous solution;

a step of finely etching the treated steel material with a weakly basic aqueous solution having a pH of 9 to 11;

a step of coating the steel material that has undergone the chemical reaction steps with a one-component thermosetting adhesive;

a step of pressing an adherend made of metal or of an uncured thermosetting resin against the steel material that has been coated with the adhesive, thereby fixing the two together; and a curing and bonding step of heating the temporarily integrated components and thereby curing both the adhesive component and the adherend, wherein said step of chemically etching the shaped steel material and said step of finely etching the treated steel material are performed so as to form, on said aluminum-plated steel material, a surface configuration in which three-dimensional protrusions having a minor diameter of at least 0.3 um and a major diameter of at least 3 um are scattered over a plain part so that, as to surface roughness profile, mean length of profile element RSm is in a range of 3 to 20 μm and maximum height of roughness profile Rz is in a range of 1 to 8 μm and a portion covered with shallow fine recesses with a diameter of 20 to 50 nm in a state of being distributed adjacent to each other on the plain part accounts for 30 to 50% of the surface area of the plain part, and in which the surface of the three-dimensional protrusions is mainly a ceramic containing silicon and the plain part is mainly a ceramic containing aluminum, the surface configuration of the aluminum-plated steel material being obtained by subjecting the aluminum-plated steel material to a specific chemical reaction treatment.

4. A method for manufacturing a composite of steel and resin, comprising:

a shaping step of shaping an aluminum-plated steel sheet by mechanical working;

a step of chemically etching the shaped steel material with an acidic or basic aqueous solution;

a step of finely etching the treated steel material with a weakly basic aqueous solution having a pH of 9 to 11;

a step of coating the steel material that has undergone the chemical reaction steps with a one-component thermosetting adhesive;

a step of implementing adhesive permeation by placing the steel material coated with the adhesive into a sealed container, reducing the pressure and then applying pressure;

a step of pressing an adherend made of metal or of an uncured thermosetting resin against the steel material that has been coated with the adhesive, thereby fixing the two together; and a curing and bonding step of heating the temporarily integrated components and thereby curing the adhesive component, wherein said step of chemically etching the shaped steel material and said step of finely etching the treated steel material are performed so as to form, on said aluminum-plated steel material, a surface configuration in which three-dimensional protrusions having a minor diameter of at least 0.3 um and a major diameter of at least 3 um are scattered over a plain part so that, as to surface roughness profile, mean length of profile element RSm is in a range of 3 to 20 μm and maximum height of roughness profile Rz is in a range of 1 to 8 μm and a portion covered with shallow fine recesses with a diameter of 20 to 50 nm in a state of being distributed adjacent to each other on the plain part accounts for 30 to 50% of the surface area of the plain part, and in which the surface of the three-dimensional protrusions is mainly a ceramic containing silicon and the plain part is mainly a ceramic containing aluminum, the surface configuration of the aluminum-plated steel material being obtained by subjecting the aluminum-plated steel material to a specific chemical reaction treatment.

5. A method for manufacturing a corrosion resistant steel material, comprising at least:
a shaping step of shaping an aluminum-plated steel sheet by mechanical working;
a step of chemically etching the shaped steel material with an acidic or basic aqueous solution;
a step of finely etching the treated steel material with a weakly basic aqueous solution having a pH of 9 to 11; and
a step of coating the steel material that has undergone the chemical reaction steps with a one-component thermosetting coating material and then curing,
wherein said step of chemically etching the shaped steel material and said step of finely etching the treated steel material are performed so as to form, on said aluminum-plated steel material, a surface configuration in which three-dimensional protrusions having a minor diameter of at least 0.3 um and a major diameter of at least 3 um are scattered over a plain part so that, as to surface roughness profile, mean length of profile element RSm is in a range of 3 to 20 μm and maximum height of roughness profile Rz is in a range of 1 to 8 μm and a portion covered with shallow fine recesses with a diameter of 20 to 50 nm in a state of being distributed adjacent to each other on the plain part accounts for 30 to 50% of the surface area of the plain part, and in which the surface of the three-dimensional protrusions is mainly a ceramic containing silicon and the plain part is mainly a ceramic containing aluminum, the surface configuration of the aluminum-plated steel material being obtained by subjecting the aluminum-plated steel material to a specific chemical reaction treatment.

6. A method for manufacturing a corrosion resistant steel material, comprising at least:
a shaping step of shaping an aluminum-plated steel sheet material by mechanical working;
a step of chemically etching the shaped steel material with an acidic or basic aqueous solution;
a step of finely etching the treated steel with a weakly basic aqueous solution having a pH of 9 to 11;
a step of coating the steel material that has undergone the chemical reaction steps with a one-component thermosetting coating material;

a step of implementing coating permeation by placing the steel material coated with the coating material into a sealed container, reducing the pressure and then applying pressure; and
a curing step of heating and curing the steel,
wherein said step of chemically etching the shaped steel material and said step of finely etching the treated steel material are performed so as to form, on said aluminum-plated steel material, a surface configuration in which three-dimensional protrusions having a minor diameter of at least 0.3 um and a major diameter of at least 3 um are scattered over a plain part so that, as to surface roughness profile, mean length of profile element RSm is in a range of 3 to 20 μm and maximum height of roughness profile Rz is in a range of 1 to 8 μm and a portion covered with shallow fine recesses with a diameter of 20 to 50 nm in a state of being distributed adjacent to each other on the plain part accounts for 30 to 50% of the surface area of the plain part, and in which the surface of the three-dimensional protrusions is mainly a ceramic containing silicon and the plain part is mainly a ceramic containing aluminum, the surface configuration of the aluminum-plated steel material being obtained by subjecting the aluminum-plated steel material to a specific chemical reaction treatment.

7. The method for manufacturing a steel material or a composite of steel and resin according to claim 1,
wherein the aqueous solution used for the fine etching has a temperature between room temperature and 70° C. and the basic substance that is added is selected from among hydrazine hydrate, ammonia and water-soluble amine compounds.

8. The method for manufacturing a steel material or a composite of steel and resin according to claim 2,
wherein the aqueous solution used for the fine etching has a temperature between room temperature and 70° C. and the basic substance that is added is selected from among hydrazine hydrate, ammonia and water-soluble amine compounds.

9. The method for manufacturing a steel material or a composite of steel and resin according to claim 3,
wherein the aqueous solution used for the fine etching has a temperature between room temperature and 70° C. and the basic substance that is added is selected from among hydrazine hydrate, ammonia and water-soluble amine compounds.

10. The method for manufacturing a steel material or a composite of steel and resin according to claim 4,
wherein the aqueous solution used for the fine etching has a temperature between room temperature and 70° C. and the basic substance that is added is selected from among hydrazine hydrate, ammonia and water-soluble amine compounds.

11. The method for manufacturing a steel material or a composite of steel and resin according to claim 5,
wherein the aqueous solution used for the fine etching has a temperature between room temperature and 70° C. and the basic substance that is added is selected from among hydrazine hydrate, ammonia and water-soluble amine compounds.

12. The method for manufacturing a steel material or a composite of steel and resin according to claim 6,
wherein the aqueous solution used for the fine etching has a temperature between room temperature and 70° C. and the basic substance that is added is selected from among hydrazine hydrate, ammonia and water-soluble amine compounds.

* * * * *